US012266291B2

(12) United States Patent
Yu et al.

(10) Patent No.: US 12,266,291 B2
(45) Date of Patent: Apr. 1, 2025

(54) DISPLAY DRIVER

(71) Applicant: SAMSUNG ELECTRONICS CO., LTD., Suwon-si (KR)

(72) Inventors: Chanbong Yu, Suwon-si (KR); Yeongshin Jang, Suwon-si (KR); Woonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/083,055

(22) Filed: Dec. 16, 2022

(65) Prior Publication Data

US 2023/0335040 A1 Oct. 19, 2023

(30) Foreign Application Priority Data

Apr. 18, 2022 (KR) ........................ 10-2022-0047579
Jun. 29, 2022 (KR) ........................ 10-2022-0079645

(51) Int. Cl.
*G09G 3/20* (2006.01)

(52) U.S. Cl.
CPC ... *G09G 3/2096* (2013.01); *G09G 2310/0291* (2013.01); *G09G 2310/08* (2013.01); *G09G 2320/0276* (2013.01); *G09G 2330/028* (2013.01)

(58) Field of Classification Search
CPC ......... G09G 3/2096; G09G 2310/0291; G09G 2310/08; G09G 2320/0276; G09G 2330/028; G09G 3/36; G09G 3/20; G09G 5/00; H03F 1/02; H03F 3/45
See application file for complete search history.

(56) References Cited

U.S. PATENT DOCUMENTS

| | | | | |
|---|---|---|---|---|
| 8,552,960 B2 | 10/2013 | Tsuchi | | |
| 10,607,560 B2 | 3/2020 | Tsuchi et al. | | |
| 2005/0259490 A1 | 11/2005 | Eom | | |
| 2010/0231577 A1* | 9/2010 | Kim | G09G 3/3648 | 345/212 |
| 2011/0080214 A1* | 4/2011 | Tsuchi | G09G 3/3688 | 330/69 |
| 2012/0326785 A1* | 12/2012 | Kwan | H03F 3/45968 | 330/252 |
| 2015/0084694 A1 | 3/2015 | Lee | | |
| 2016/0240155 A1 | 8/2016 | Yang et al. | | |
| 2017/0206849 A1* | 7/2017 | Wu | G09G 3/3648 | |

FOREIGN PATENT DOCUMENTS

KR 10-2011-0024152 A 3/2011

* cited by examiner

*Primary Examiner* — Michael A Faragalla
(74) *Attorney, Agent, or Firm* — Sughrue Mion, PLLC

(57) ABSTRACT

A display driver is provided. The display driver includes: a plurality of source amplifiers connected to a plurality of source lines of a display panel, wherein one of the plurality of source amplifiers includes an input stage and an output stage configured to output a grayscale voltage to a source line of the plurality of source lines; and a decoder circuit configured to provide at least one of a plurality of gamma voltages to the input stage based on image data. The output stage includes a plurality of unit circuits connected to each other in parallel between the input stage and an output pad connected to the source line. Each of the plurality of unit circuits includes a buffer switch and an output buffer connected to the input stage, and is connected to the output pad through a resistor.

20 Claims, 19 Drawing Sheets

DISPLAY DRIVER

CROSS-REFERENCE TO RELATED APPLICATIONS

This application claims priority to Korean Patent Application No. 10-2022-0047579, filed on Apr. 18, 2022, and Korean Patent Application No. 10-2022-0079645, filed on Jun. 29, 2022, in the Korean Intellectual Property Office, the disclosures of which are incorporated by reference herein in their entireties.

BACKGROUND

The present disclosure relates to a display driver.

A liquid crystal display (LCD), an organic light emitting device (OLED), and the like have been used as a display device in an electronic device for displaying an image, such as a TV, a laptop computer, a monitor, and a mobile device. A display device may include a display panel having a plurality of pixels and a display driver for applying an electric signal to the plurality of pixels, and an image may be realized by the electric signal provided to the plurality of pixels by the display driver. Recently, various studies have been conducted to improve performance such as resolution and a scan rate of a display device.

SUMMARY

One or more example embodiments provide a display driver which may, by improving a slew rate of each of source amplifiers outputting a grayscale voltage in a source driver connected to source lines of a display panel, drive a display panel with a high scan rate.

According to an aspect of an example embodiment, a display driver includes: a plurality of source amplifiers connected to a plurality of source lines of a display panel, wherein at least one of the plurality of source amplifiers includes an input stage and an output stage configured to output a grayscale voltage to a source line of the plurality of source lines; and a decoder circuit configured to provide at least one of a plurality of gamma voltages to the input stage based on image data. The output stage includes a plurality of unit circuits connected to each other in parallel between the input stage and an output pad connected to the source line. Each of the plurality of unit circuits includes a buffer switch and an output buffer connected to the input stage, and is connected to the output pad through a resistor.

According to an aspect of an example embodiment, a display driver includes: an output pad connected to one of a plurality of source lines of a display panel, each of the plurality of source lines being connected to a plurality of pixels; and a source amplifier configured to generate a grayscale voltage corresponding to a selected pixel among the plurality of pixels based on at least one gamma voltage. The source amplifier includes an amplifier circuit configured to receive the at least one gamma voltage and a plurality of buffer circuits connected to each other in parallel between the amplifier circuit and the output pad. Each of the plurality of buffer circuits includes an output buffer and a buffer switch connected between the output buffer and the amplifier circuit. The source amplifier is configured to output a first grayscale voltage corresponding to a first pixel among the plurality of pixels during a first time period, and output a second grayscale voltage corresponding to a second pixel during a second time period subsequent to the first time period. Each of the plurality of buffer circuits is configured to turn off the buffer switch between the first time period and the second time period to disconnect the output buffer of each the plurality of buffer circuits from the amplifier circuit.

According to an aspect of an example embodiment, a display driver includes: an output pad connected to one of a plurality of source lines of a display panel, each of the plurality of source lines being connected to a plurality of pixels; and a source amplifier configured to generate a grayscale voltage corresponding to a selected pixel among the plurality of pixels based on at least one gamma voltage. The source amplifier includes an amplifier circuit configured to receive the at least one gamma voltage and a plurality of buffer circuits connected in parallel with each other between the amplifier circuit and the output pad. The amplifier circuit includes a plurality of input terminals and each of the plurality of buffer circuits includes an output buffer. An output switch is connected between a first buffer circuit of the plurality of buffer circuits and the output pad, and a node between an output terminal of the output buffer of the first buffer circuit and the output switch is connected to a first input terminal of the plurality of input terminals through a feedback path. The source amplifier is configured to output a first grayscale voltage corresponding to a first pixel among the plurality of pixels during a first time period, and output a second grayscale voltage corresponding to a second pixel during a second time period subsequent to the first time period. The source amplifier is configured to adjust a level of the at least one gamma voltage input to the amplifier circuit to a correspond to the second grayscale voltage while the output switch is turned off between the first time period and the second time period.

BRIEF DESCRIPTION OF DRAWINGS

The above and other aspects, features, and advantages of the present disclosure will be more clearly understood from the following description of example embodiments, taken in combination with the accompanying drawings, in which.

DETAILED DESCRIPTION

Figure 1:
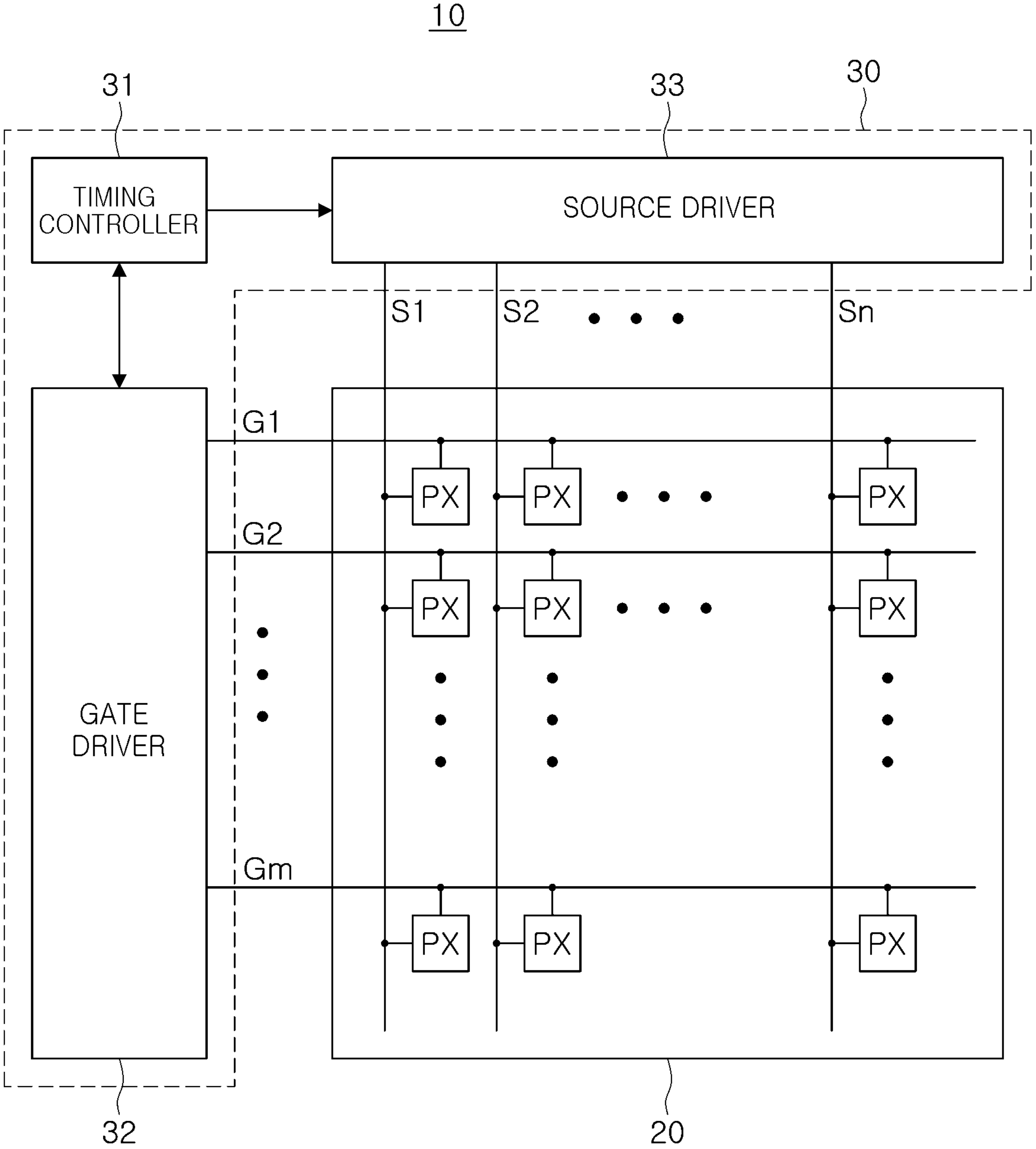
FIG. 1 is a block diagram illustrating a display device including a display driver according to an example embodiment.

Hereinafter, example embodiments will be described as follows with reference to the accompanying drawings. The same reference numerals may refer to the same elements throughout. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present.

FIG. 1 is a block diagram illustrating a display device including a display driver according to an example embodiment.

Referring to FIG. 1, the display device 10 may include a display panel 20 and a display driver 30. The display driver 30 may include a timing controller 31, a gate driver 32, and a source driver 33. The display panel 20 may include a plurality of pixels PX disposed along a plurality of gate lines G1-Gm and a plurality of source lines S1-Sn.

According to an example embodiment, the display device 10 may display an image in units of frames. A time required to display a frame may be referred to as a vertical period, and the vertical period may be determined by a scan rate of the display device 10. As an example, when the scan rate of the display device 10 is 60 Hz, the vertical period may be 1/60 sec, about 16.7 milliseconds (ms), and when the scan rate is 144 Hz, the vertical period may be about 6.94 ms.

During a vertical period, the gate driver 32 may scan each of the plurality of gate lines G1-Gm. A time for the gate driver 32 to scan each of the plurality of gate lines G1 to Gm may be referred to as a horizontal period, and during a horizontal period, the source driver 33 may input a grayscale voltage to the pixels PX. The grayscale voltage may be a voltage output by the source driver 63 based on image data, and brightness of each of the pixels PX may be determined by the grayscale voltage.

The horizontal period may vary depending on the vertical period and the number of gate lines G1-Gm included in the display panel 20. For example, when the scan rate of the display device 10 is 144 Hz and the number of gate lines G1-Gm is 3200, the horizontal period may be about 2.17 microseconds (μs).

Accordingly, the source driver 33 may need to be able to input a grayscale voltage to each of the n pixels PX connected to the gate line selected by the gate driver 32 for 2.17 μS, and accordingly, the characteristics of the source driver 33 may greatly affect performance of the display device 10. Furthermore, recently, a scan rate of the display device 10 has been gradually increased. For example, when the scan rate of the display device 10 is increased to 180 Hz, the horizontal period may be reduced to about 1.74 μs. Accordingly, to improve the scan rate of the display device 10, it may be necessary to improve the slew rate of each of the source amplifiers outputting the grayscale voltage from the source driver 33 to the source lines S1-Sn.

An output switch and a resistor for alleviating electrostatic discharge (ESD) may be connected between the source amplifiers and the source lines S1-Sn of the display panel 20, and the source amplifiers and the source lines S1-Sn may be connected to or disconnected from each other by turning the output switch on or off. The slew rate of the voltage output from the source amplifiers to the source lines S1-Sn may be lowered by the resistor as well as a resistive component of the output switch.

According to an example embodiment, the output switch connected between the source amplifiers and the source lines S1-Sn may be omitted, and a plurality of unit circuits may be included in an output stage of each of the source amplifiers. Each of the plurality of unit circuits may include a buffer switch and an output buffer, and the total resistance of the output stage may be lowered by connecting the plurality of unit circuits to each other in parallel. Also, because the connection between the source amplifiers and the source lines S1-Sn may be controlled by an operation of the buffer switch in each of the plurality of unit circuits without the output switch, the slew rate of the voltage output by each of the source amplifiers may effectively improve.

Figure 2:
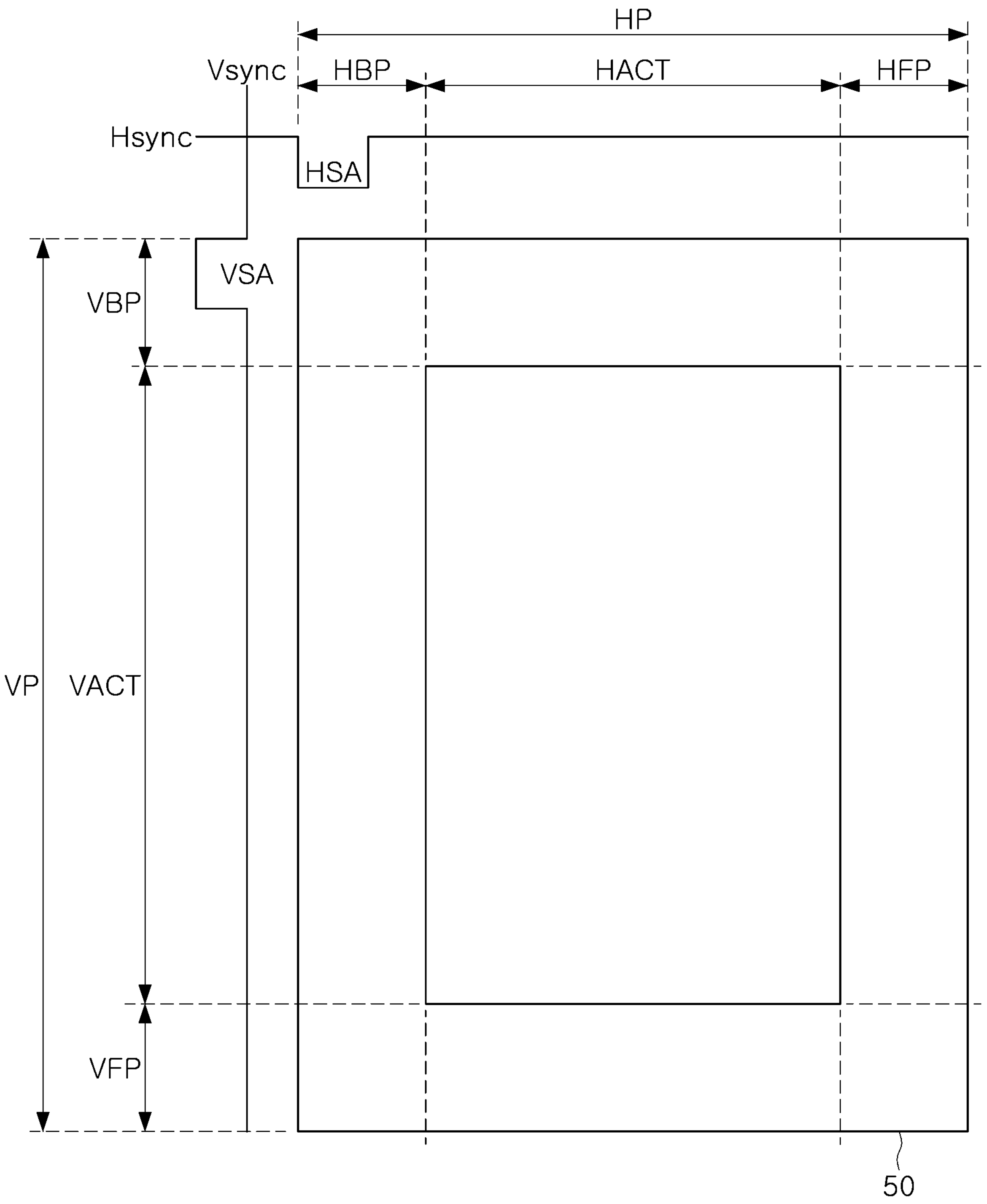
FIG. 2 is a diagram illustrating operation of a display device according to an example embodiment.

FIG. 2 is a diagram illustrating operation of a display device according to an example embodiment.

Referring to FIG. 2, a display panel 50 may operate based on a vertical synchronization signal Vsync having a vertical period VP and a horizontal synchronization signal Hsync having a horizontal period HP. The vertical period VP may include a first vertical porch period VBP, a vertical active period VACT, and a second vertical porch period VFP, and the first vertical porch period VBP may include a vertical speed action VSA. The first vertical porch period VBP may be referred to as a vertical back porch period, and the second vertical porch period VFP may be referred to as a vertical front porch period.

The horizontal period HP may include a first horizontal porch period HBP, a horizontal active period HACT, and a second horizontal porch period HFP, and the first horizontal porch period HBP may include a horizontal speed action HSA. The first horizontal porch period HBP may be referred to as a horizontal back porch period, and the second horizontal porch period HFP may be referred to as a horizontal front porch period.

Scanning of the plurality of gate lines included in the display panel 50 and inputting of data to a pixel connected to the scanned gate line may be performed during vertical and horizontal active periods VACT and HACT. That is, the gate lines may be scanned in sequence during the vertical active period VACT, and data input to the pixel connected to the scanned gate line may be performed during the horizontal active period HACT.

As described above, a scan rate of the display panel 50 has been gradually increased, and accordingly, the vertical period VP and the horizontal period HP have decreased. Due to the decrease in the vertical period VP and the horizontal period HP, the source driver needs to be able to input image data to the pixels within a shorter period of time. To input image data within the shorter period of time, the source amplifiers outputting a grayscale voltage may operate at a higher speed. For example, the display panel 50 may be driven at a high scan rate by improving the slew rate of voltages output by the source amplifiers.

According to an example embodiment, each of the source amplifiers may include an input stage configured to operate as an amplifier circuit and an output stage configured to operate as a buffer circuit, and the output stage may include a plurality of unit circuits connected to each other in parallel. For example, each of the plurality of unit circuits may be connected between an output pad connected to the display panel 50 and an input stage, and a resistor may be connected between each of the plurality of unit circuits and the output pad. Accordingly, as total resistance of the output stage decreases, the slew rate of the output voltage of the source amplifiers may improve.

Figure 3:
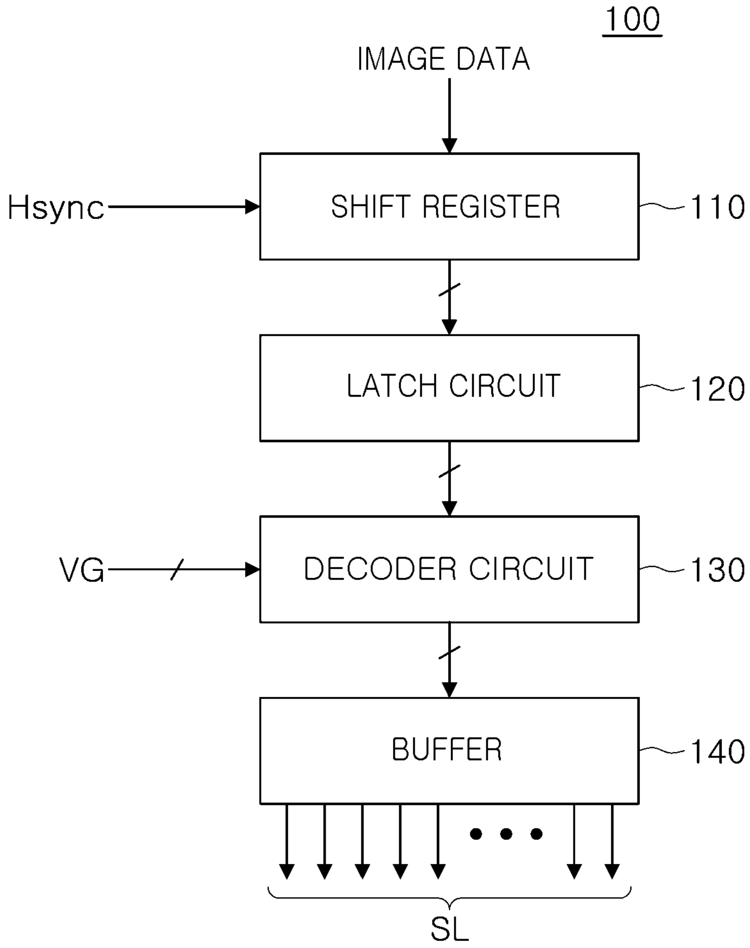
FIG. 3 is a block diagram illustrating a source driver included in a display device according to an example embodiment.

FIG. 3 is a block diagram illustrating a source driver included in a display device according to an example embodiment.

Referring to FIG. 3, a source driver 100 according to an example embodiment may include a shift register 110, a latch circuit 120, a decoder circuit 130, and a buffer 140. According to an example embodiment, the latch circuit 120 may include a sampling circuit for sampling data and a holding latch for storing data sampled by the sampling circuit. Each of the components 110-140 included in the source driver 100 is not limited to the examples illustrated in FIG. 3, and may vary.

The shift register 110 may control an operation timing of each of the plurality of sampling circuits included in the latch circuit 120 in response to a horizontal synchronization signal Hysnc. The horizontal synchronization signal Hsync may be a signal having a predetermined period. The latch circuit 120 may sample and store image data according to a shift order of the shift register 110. The latch circuit 120 may output image data to the decoder circuit 130. The decoder circuit 130 may include a digital-to-analog converter DAC.

The decoder circuit 130 may receive a plurality of gamma voltages VG together with image data. According to an example embodiment, the number of the plurality of gamma voltages VG may correspond to the number of bits of image data. For example, when the image data is 8-bit data, the number of the plurality of gamma voltages VG may be 256 or less, and when the image data is 10-bit data, the number of the plurality of gamma voltages VG may be 1024.

The buffer 140 may include a plurality of source amplifiers, and the plurality of source amplifiers may be connected to a plurality of source lines SL. The plurality of source lines SL and the plurality of source amplifiers may be connected one-to-one. Each of the plurality of source amplifiers may include an input stage and an output stage, and the input stage may have a plurality of input terminals. The decoder circuit 130 may select at least a portion of the plurality of gamma voltages VG based on the image data and may provide the voltages to an input stage of each of the plurality of source amplifiers as an input voltage.

Figure 4:
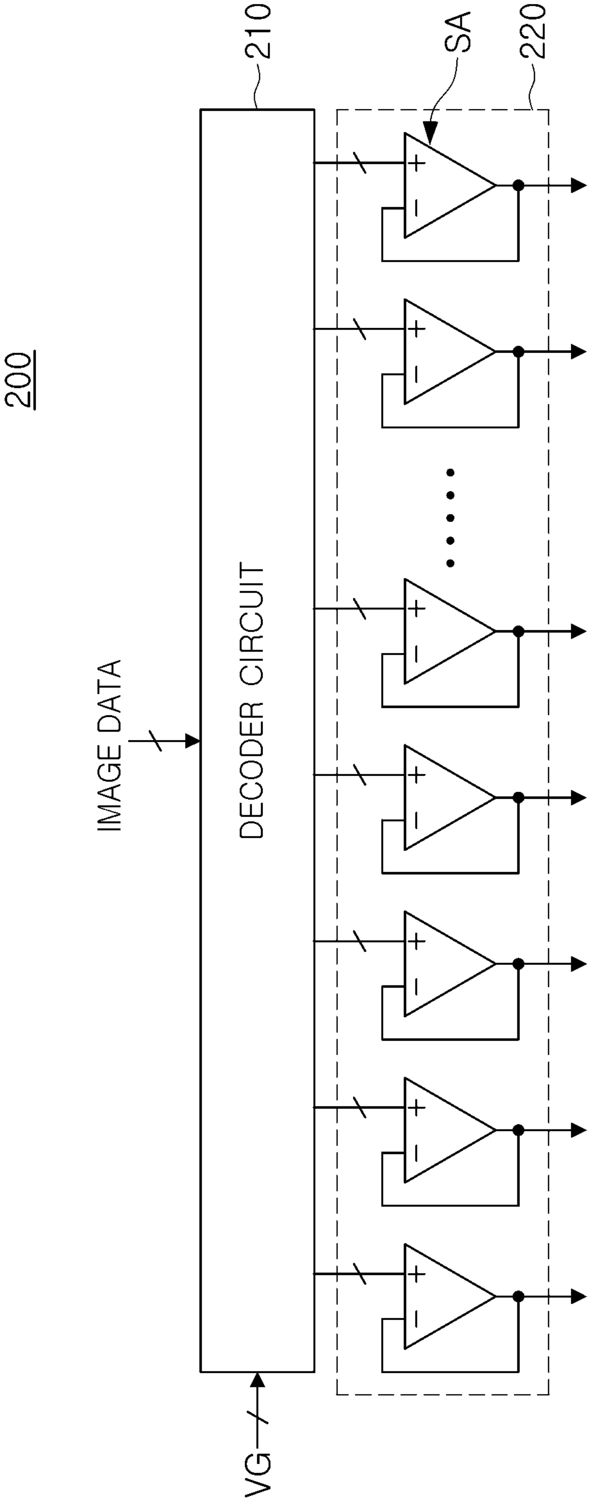
FIG. 4 is a diagram illustrating a structure of a source driver according to an example embodiment.

FIG. 4 is a diagram illustrating a structure of a source driver according to an example embodiment.

Referring to FIG. 4, the source driver 200 according to an example embodiment may include a decoder circuit 210 and a buffer 220. The decoder circuit 210 may receive a plurality of gamma voltages VG together with image data, and the number of the plurality of gamma voltages VG may correspond to the number of bits of the image data. When the image data has N bits, the number of the plurality of gamma voltages VG input to the decoder circuit 210 may be $2^N$ or less.

The buffer 220 may include a plurality of source amplifiers SA. As illustrated in FIG. 4, each of the source amplifiers SA may include a non-inverting input terminal, and the decoder circuit 210 may apply at least one gamma voltage selected from a plurality of gamma voltages VG to the non-inverting input terminals of the plurality of source amplifiers SA. An inverting input terminal of each of the source plurality of amplifiers SA may be connected to an output terminal through a feedback path. According to example embodiments, the non-inverting input terminal of each of the source amplifiers SA may include two or more non-inverting input terminals.

An output terminal of the source amplifier SA may be connected to an output pad, and the output pad may be connected to a source line of the display panel. A resistor for alleviating the effect of electrostatic discharge may be connected between the output terminal of the source amplifier SA and the output pad.

According to an example embodiment, the output stage in the source amplifier SA may be configured with a plurality of unit circuits connected to each other in parallel, and a resistor may be connected to each of the plurality of unit circuits. Accordingly, because the resistors and the plurality of unit circuits are connected to each other in parallel, total resistance between the input stage of the source amplifier SA and the output pad may be reduced, and the slew rate of the voltage input to the source line of the display panel may be improved through the output pad.

Figure 5:
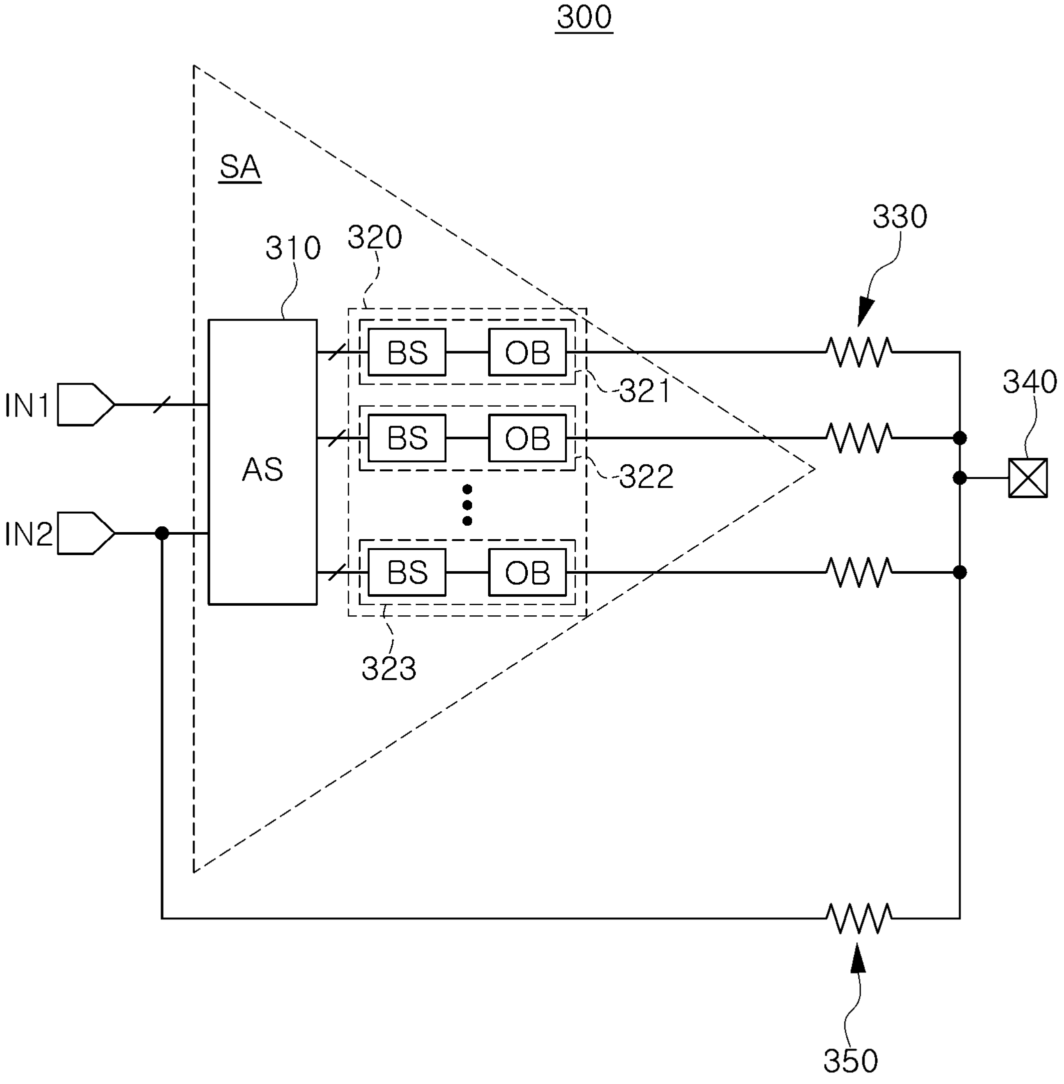
FIG. 5 is a diagram illustrating a display driver according to an example embodiment.

FIG. 5 is a diagram illustrating a display driver according to an example embodiment.

FIG. 5 is a diagram illustrating a portion of components included in the source driver in the display driver 300 according to an example embodiment. Referring to FIG. 5, the source amplifier SA may include an input stage 310 and an output stage 320. The input stage 310 may operate as an amplifier circuit, and the output stage 320 may operate as a buffer circuit.

The input stage 310 may be connected to the first input terminal IN1 and the second input terminal IN2, and may receive at least one gamma voltage through the first input terminal IN1. According to an example embodiment, the first input terminal IN1 may include non-inverting input terminals separated from each other, and a plurality of gamma voltages having different levels may be input, respectively, through the non-inverting input terminals of the first input terminal IN1.

The output stage 320 may include a plurality of unit circuits 321-323. Each of the plurality of unit circuits 321-323 may include a buffer switch BS and an output buffer OB, and the output buffer OB may be connected to or separated from the input stage 310 by operation of the buffer switch BS.

Each of the plurality of unit circuits 321-323 may be connected to the output pad 340 through the resistor 330. For example, the output pad 340 may be connected to one of a plurality of source lines disposed on the display panel. Accordingly, the voltage output by the source amplifier SA may be input as a grayscale voltage to a selected pixel among a plurality of pixels connected to the source line through the output pad 340. As illustrated in FIG. 5, only the resistor 330 may be connected between each of the plurality of unit circuits 321-323 and the output pad 340.

The second input terminal IN2 connected to the input stage 310 may be connected to the output pad 340 through a feedback path. As an example, a feedback resistor 350 different from the resistor 330 connected to each of the plurality of unit circuits 321-323 may be connected to the feedback path.

As illustrated in FIG. 5, according to an example embodiment, a plurality of unit circuits 321-323 may be connected in parallel between the input stage 310 and the output pad 340. Also, because each of the plurality of unit circuits 321-323 is connected to the resistor 330, a resistive component present between the input stage 310 and the output pad 340 may be reduced. Accordingly, the slew rate of the grayscale voltage supplied to the source line through the output pad 340 may improve.

Also, as illustrated in FIG. 5, according to an example embodiment, an output switch may not be provided between each of the plurality of unit circuits 321-323 and the resistor 330. Therefore, the effect of the operations of turning the output switch on and off and the resistive component of the output switch on the grayscale voltage may be removed, such that the slew rate of the grayscale voltage may effectively improve as compared to a structure that includes the output switch.

Figure 6:
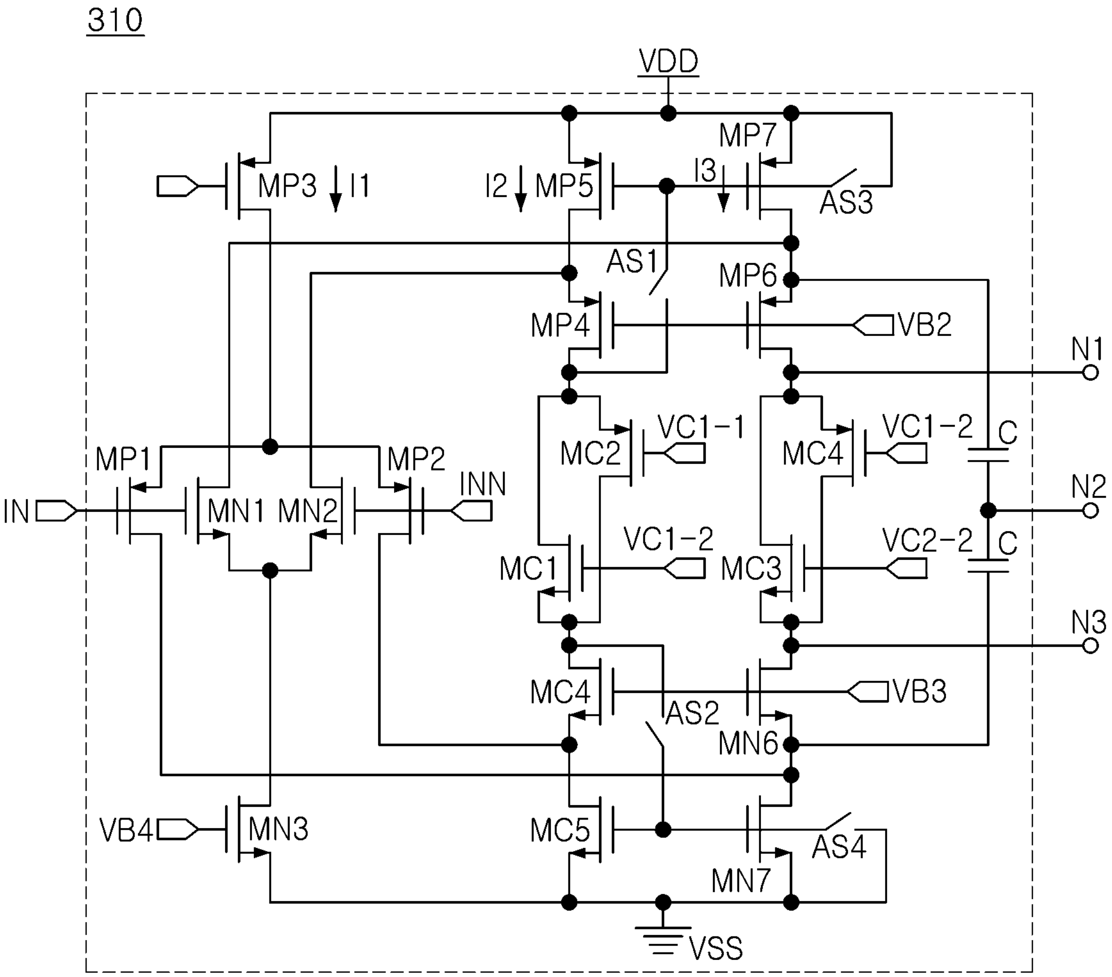
FIGS. 6 to 8 are diagrams illustrating a structure of a source amplifier included in a display driver according to an example embodiment.
Figure 7:
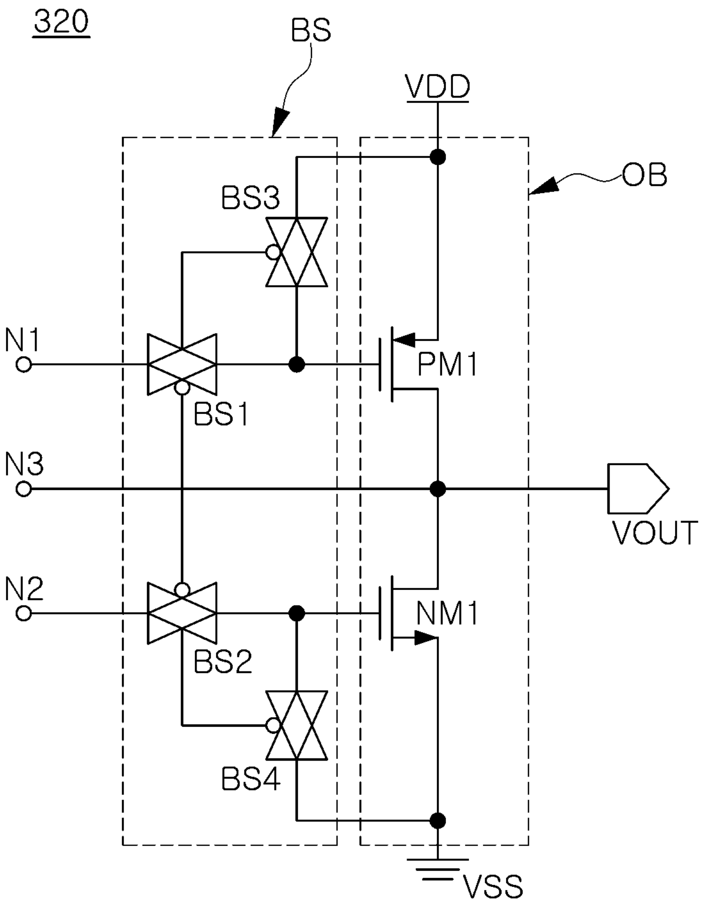
Figure 8:
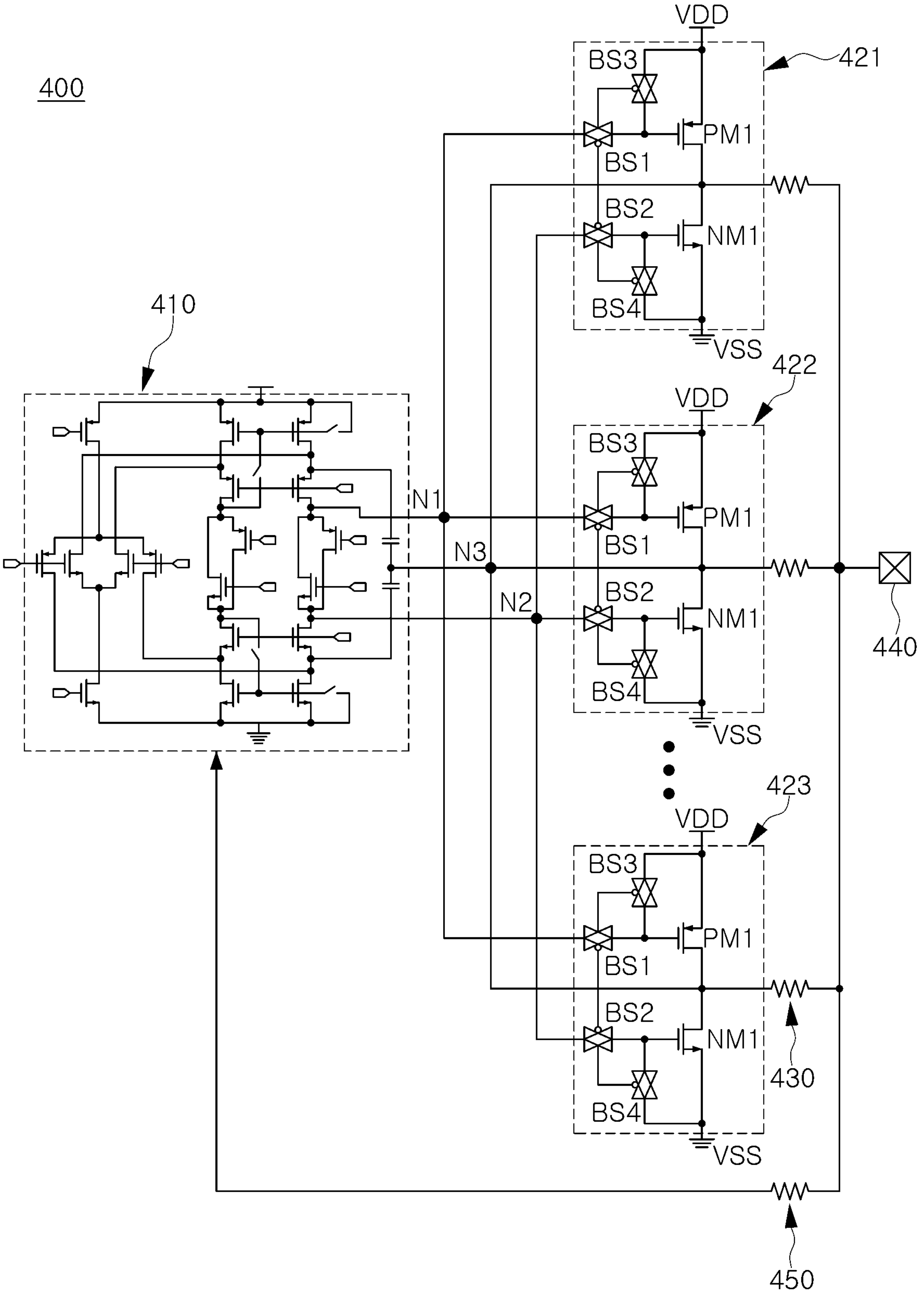

FIGS. 6 to 8 are diagrams illustrating a structure of a source amplifier included in a display driver according to an example embodiment.

FIG. 6 is a circuit diagram illustrating an input stage 310 included in a source amplifier according to an example embodiment. As described above, the input stage 310 may operate as an amplifier circuit and may have a folded cascode structure.

Referring to FIG. 6, the input stage 310 may include first to seventh PMOS transistors MP1-MP7, first to seventh NMOS transistors MN1-MN7, and first to fourth control transistors MC1-MC4. However, the circuit of the input stage 310 is not necessarily limited to the example illustrated in FIG. 6, and in example embodiments, the input stage 310 may be implemented as a circuit having a structure different from that of the circuit illustrated in FIG. 6. As illustrated in FIG. 6, a magnitude of each of the first to third currents I1-I3 flowing in the input stage 310 may vary depending on image data input to the decoder circuit connected to the source amplifier, and the gamma voltage input to the first input terminal IN1 may be amplified by the first to third currents I1 to I3.

Referring to FIG. 6, the input stage 310 may include first to fourth amplifier switches AS1 to AS4. Each of the first to fourth amplifier switches AS1 to AS4 may maintain a turned-on state while the source amplifier is activated and outputs the grayscale voltage to the display panel. Accordingly, while the source amplifier operates, the first to third currents I1-I3 may flow from a first power node supplying the first power supply voltage VDD to a second power node supplying the second power supply voltage VSS. For example, a ratio of the first to third currents I1 to I3 may be determined by the plurality of bias voltages VB1-VB4 and the plurality of control voltages VC1-VC4.

FIG. 7 is a circuit diagram illustrating a unit circuit included in the output stage 320 in the source amplifier according to an example embodiment. Referring to FIGS. 6 and 7, the output stage 320 may be connected to the input stage 310 through first to third nodes N1-N3.

The output stage 320 may include a buffer switch BS and an output buffer OB. The output buffer OB may include a PMOS transistor PM1 and an NMOS transistor NM1 connected in series between the first power node and the second power node. The output voltage VOUT may be output by a node between the PMOS transistor PM1 and the NMOS transistor NM1, and for example, the output voltage VOUT may be a grayscale voltage input to a pixel of the display panel.

The buffer switch BS may include a plurality of buffer switches BS1-BS4, and for example, each of the plurality of buffer switches BS1-BS4 may be implemented as a CMOS transfer gate. Referring to FIG. 7, the first buffer switch BS1 may be connected between the first node N1 and the gate of the PMOS transistor PM1, and the second buffer switch BS2 may be connected between the second node N2 and the NMOS transistor NM1. The third buffer switch BS3 may be connected between a gate of the PMOS transistor PM1 and the first power node, and the fourth buffer switch BS4 may be connected between a gate of the NMOS transistor NM1 and the second power node.

Each of the plurality of buffer switches BS1-BS4 may be turned on or turned off by the first enable signal and the second enable signal. For example, the first enable signal may be input to a gate of an NMOS transistor included in each of the first buffer switch BS1 and the second buffer switch BS2, and a gate of the PMOS transistor included in each of the third buffer switch BS3 and the fourth buffer switch BS4. The second enable signal may be input to a gate of the PMOS transistor included in each of the first and second buffer switches BS1 and BS2 and a gate of the NMOS transistor included in each of the third buffer switch BS3 and the fourth buffer switch BS4. The first enable signal and the second enable signal may be complementary signals having a phase difference of 180 degrees from each other.

As described above, according to an example embodiment, the output stage may include a plurality of unit circuits, and the plurality of unit circuits may be connected to each other in parallel. Referring to FIG. 8, a plurality of unit circuits 421-423 may be connected to an input stage 410 in the source amplifier 400 of the display driver, and the plurality of unit circuits 421-423 may be connected to each other in parallel. Resistors 430 may be respectively connected between the plurality of unit circuits 421-423 and the output pad 440. The configuration of the input stage 410 may be the same as the input stage 310 described above with reference to FIG. 6. A resistor 430 may be connected between the unit circuit 421 and the output pad 440, a resistor 430 may be connected between the unit circuit 422 and the output pad 440, and a resistor 430 may be connected between the unit circuit 423 and the output pad 440. Each of the plurality of unit circuits 421-423 may operate by receiving the first power supply voltage VDD and the second power supply voltage VSS.

Each of the plurality of unit circuits 421-423 may be connected to the input stage 410 through first to third nodes N1-N3. The voltage amplified and output by the input stage 410 may be buffered in each of the plurality of unit circuits 421-423 and may be supplied as a grayscale voltage to the display panel through the output pad 440. As described above, the node between the resistor 430 and the output pad 440 may be connected to one of the input terminals of the input stage 410 through the feedback resistor 450.

In the source amplifier 400 having the structure illustrated in FIG. 8, a grayscale voltage may be output to the output pad 440 by the current flowing through each of the plurality of unit circuits 421-423. Accordingly, each of the plurality of unit circuits 421-423 may be implemented by devices having a relatively small size as compared to a related structure in which only a single unit circuit is connected between the input stage 410 and the output pad 440. For example, a size of an individual device included in each of the plurality of unit circuits 421-423 may be smaller than a size of an individual device included in the input stage 410.

In this regard, the sizes of the PMOS transistor PM and the NMOS transistor NM included in each of the plurality of unit circuits 421-423 in the structure illustrated in FIG. 8 may be smaller than the sizes of PMOS transistors and NMOS transistors included in a unit circuit in a structure in which only one unit circuit is connected between the input stage 410 and the output pad 440. For example, when N (N being a positive integer) unit circuits 421-42N are connected to a single input stage 410, the PMOS transistor PM and the NMOS transistor NM included in the unit circuits 421-42N may be 1/N times the size of the PMOS transistor and the NMOS transistor included in the unit circuit in a structure in which a single unit circuit is connected to a single input stage 410. Accordingly, the circuit area required to implement the display driver including the source amplifier 400 may not increase as compared to a structure in which only a single unit circuit is connected between the input stage 410 and the output pad 440.

As illustrated in FIG. 8, resistance between the input stage 410 and the output pad 440 may be determined by the plurality of unit circuits 421-423 and the resistor 430. Accordingly, as compared to a structure in which only a single unit circuit and a single resistor are connected between the input stage 410 and the output pad 440, resistance between the input stage 410 and the output pad 440 may be reduced, and also, the slew rate of the grayscale voltage input to the source line of the display panel through the output pad 440 may improve.

FIGS. 9 to 11, 12A and 12B are diagrams illustrating operations of a display driver according to an example embodiment.

Referring to FIGS. 9 to 11, 12A and 12B, the source driver 500 may be connected to the source line SL of the display panel 600. A plurality of pixels PX1 and PX2 may be connected to the source line SL, and the plurality of pixels PX1 and PX2 may be connected to the gate driver 610 through gate lines GL1 and GL2. The gate driver 610 may scan the gate lines GL1 and GL2 in sequence and may select the plurality of pixels PX1 and PX2 in sequence.

Figure 9:
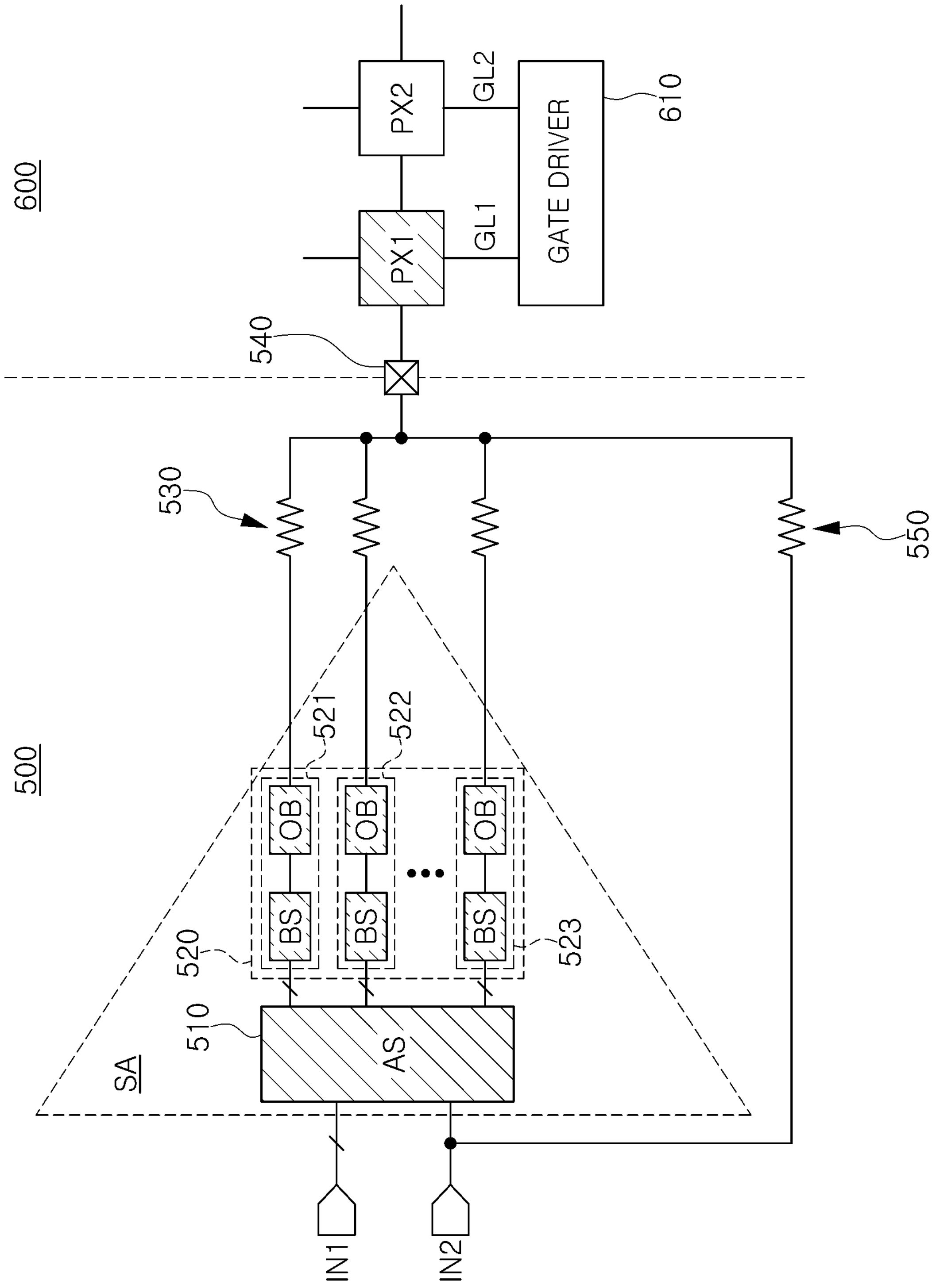
FIGS. 9 to 11, 12A and 12B are diagrams illustrating operations of a display driver according to an example embodiment.

FIG. 9 is a diagram illustrating operation during a first time period in which the gate driver 610 selects the first pixel PX1. Referring to FIG. 9, the gate driver 610 may select the first pixel PX1 during the first time period, and the source amplifier SA of the source driver 500 may output a first grayscale voltage corresponding to image data for the first pixel PX1 to display. To this end, the decoder connected to the source amplifier SA may select a gamma voltage required for the source amplifier SA to output the first grayscale voltage and may input the voltage to the first input terminal IN1.

The source amplifier SA may include an input stage 510 configured to operate as an amplifier circuit, and a plurality of unit circuits 521-523. The plurality of unit circuits 521-523 may form an output stage of the source amplifier SA, and may buffer a voltage output by the input stage 510 and may output the buffered voltage to the output pad 540. A resistor 530 may be connected to each of the plurality of unit circuits 521-523, and the output pad 540 may be connected to the resistors 530, and the second input terminal IN2 through a feedback resistor 550.

The plurality of unit circuits 521-523 may be connected in parallel between the input stage 510 and the output pad 540. Accordingly, a resistive component between the input stage 510 and the output pad 540 may be reduced, and the slew rate of the first grayscale voltage output to the first pixel PX1 through the output pad 540 may improve, such that the display panel 600 may be driven at a high scan rate and a response speed of the display panel 600 may improve.

Each of the plurality of unit circuits 521-523 may include a buffer switch BS and an output buffer OB. Because the current output by the input stage 510 may flow in the plurality of unit circuits 521-523 in a dispersed manner, the buffer switch BS and/or the output buffer OB may be implemented by devices having a relatively small size. Accordingly, the source amplifier SA with the plurality of unit circuits 521-523 may be implemented without increasing a circuit area of the source amplifier SA.

Figure 10:
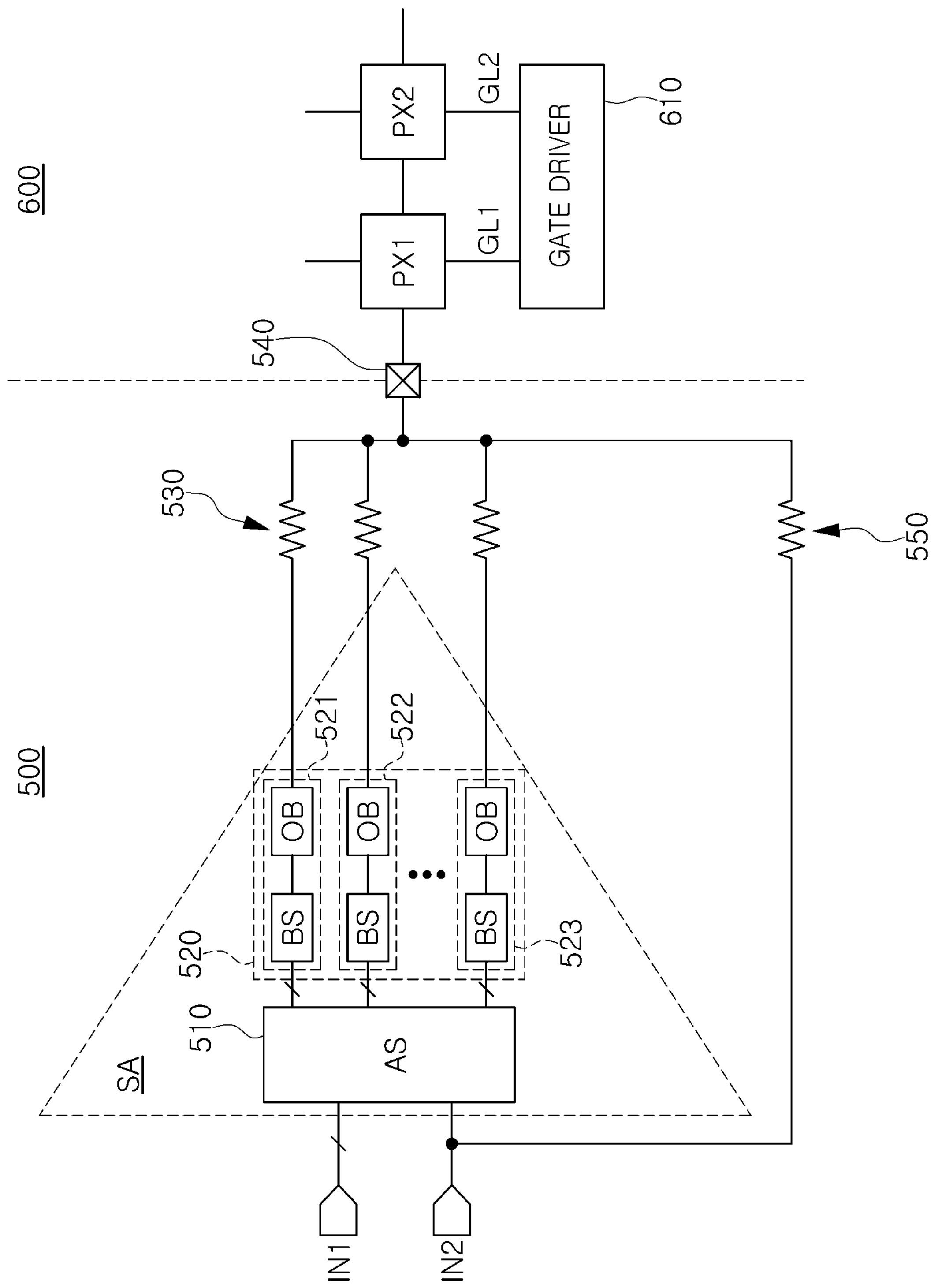

When the first time period in which the gate driver 610 selects the first pixel PX1 ends, the buffer switch BS included in each of the plurality of unit circuits 521-523 may be turned off as illustrated in FIG. 10, and a current may not flow through the output buffer OB. Accordingly, output of the grayscale voltage through the output pad 540 may be terminated, and the output buffer OB may be separated from the input stage 510.

Figure 11:
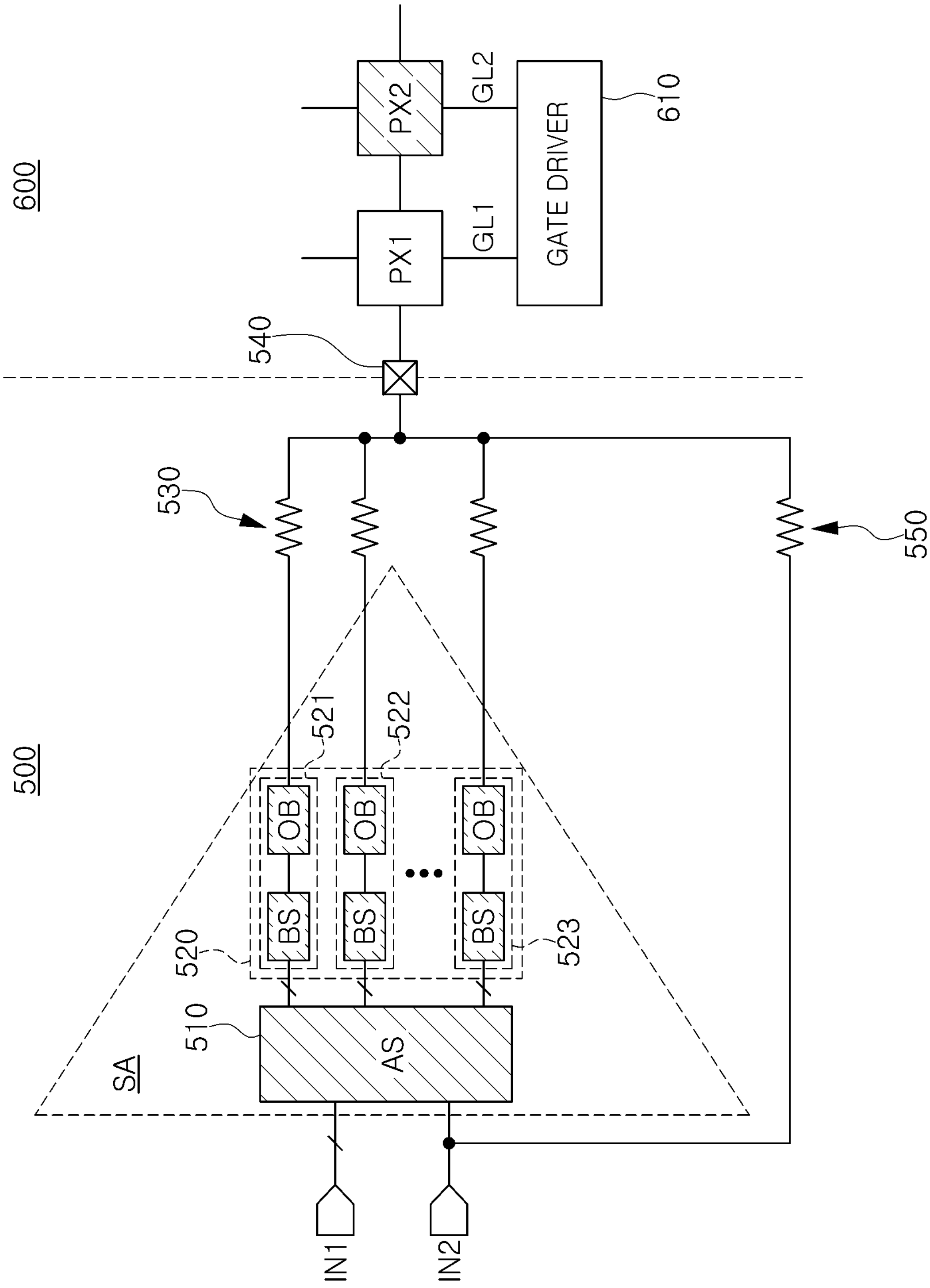

During a second time period after the first time period, the gate driver 610 may select the second pixel PX2. Referring to FIG. 11, the gate driver 610 may select the second pixel PX2, and the source amplifier SA of the source driver 500 may output a second grayscale voltage corresponding to image data for the second pixel PX2 to display. The source amplifier SA may receive a gamma voltage necessary for outputting the second grayscale voltage from the decoder circuit of the source driver 500.

For example, the second grayscale voltage may have a level different from that of the first grayscale voltage. Accordingly, to drive the display panel 600 at a high scan rate, a voltage level of the output pad 540 may need to be increased to a level of the second grayscale voltage within a relatively short time period during the second horizontal period. According to an example embodiment, the output stage may be configured with a plurality of unit circuits 521-523 connected to each other in parallel to reduce resistance between the input stage 510 and the output pad 540. Accordingly, the voltage level of the output pad 540 may be rapidly increased to the level of the second grayscale voltage during the second horizontal period.

Figure 12A:
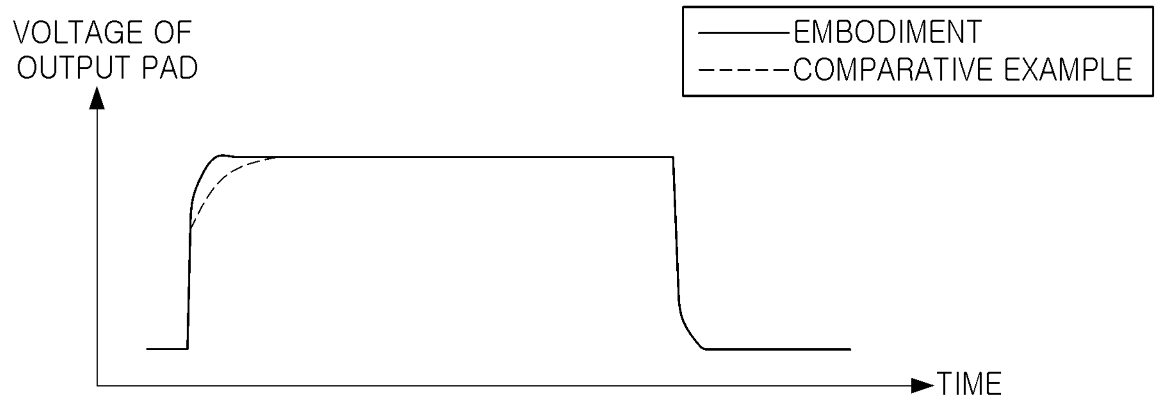
Figure 12B:
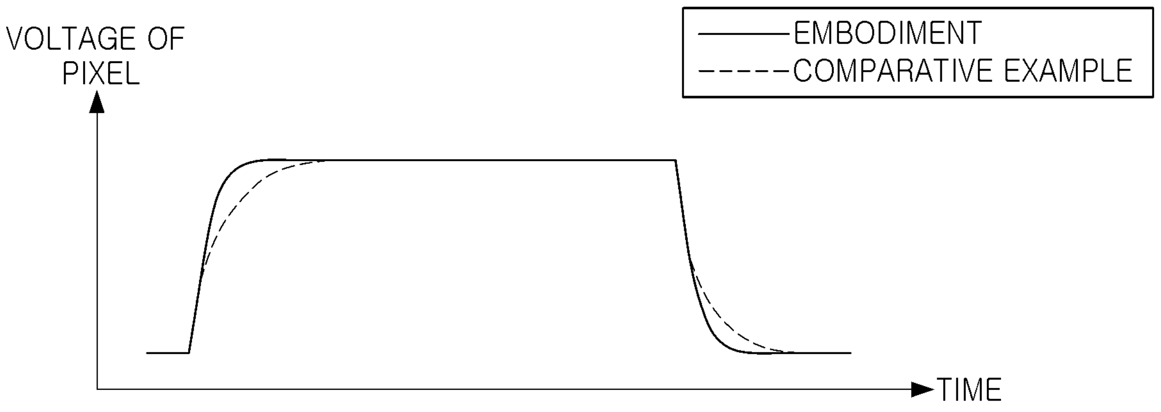

FIGS. 12A and 12B are diagrams illustrating the grayscale voltage output by the source driver 500 described with reference to FIGS. 9 to 11. In the graphs illustrated in FIGS. 12A and 12B, the line corresponding to the embodiment label is a graph obtained by measuring the grayscale voltage output by the source amplifier SA according to example embodiments, which includes a plurality of unit circuits 521-523 as described with reference to FIGS. 9 to 11. The line corresponding to the comparative example label is a graph in which a grayscale voltage is measured when the output stage is configured with only a single unit circuit in the source amplifier.

The graph in FIG. 12A represents the voltage of the output pad 540. Referring to FIG. 12A, the slew rate of the voltage of the output pad 540 according to example embodiments in which the output stage is configured with a plurality of unit circuits 521-523 is higher than the slew rate of the voltage of the output pad 540 in the comparative example in which the output stage is configured with only a single unit circuit.

The graph in FIG. 12B is a graph representing a voltage measured at a pixel connected to the output pad 540 through a source line. Similar to the graph of FIG. 12A, in FIG. 12B the slew rate of the voltage measured from a pixel according to example embodiments in which the output stage is configured with a plurality of unit circuits 521-523 is higher than the slew rate of the voltage measured from the pixel in the comparative example in which the output stage is configured with only a single unit circuit.

As an example, when the grayscale voltage increases to a swing level of 5V, the rise time period in which the voltage of the output pad 540 increases to the level of the grayscale voltage may be 0.7 μs or more, whereas the rise time period in which the voltage of the output pad 540 increases to the level of the grayscale voltage may be about 0.5 μs. Also, the rise time period required for the voltage of the pixel to increase to the level of the grayscale voltage may be 2 μs or more in the comparative example, whereas the rise time period may be 1.7 μs or less in example embodiments. Accordingly, in example embodiments, about 20% of slew rate improvement may be obtained as compared to the comparative example, and the display panel may be driven even under a high scan rate condition in which the horizontal period is limited.

Figure 13:
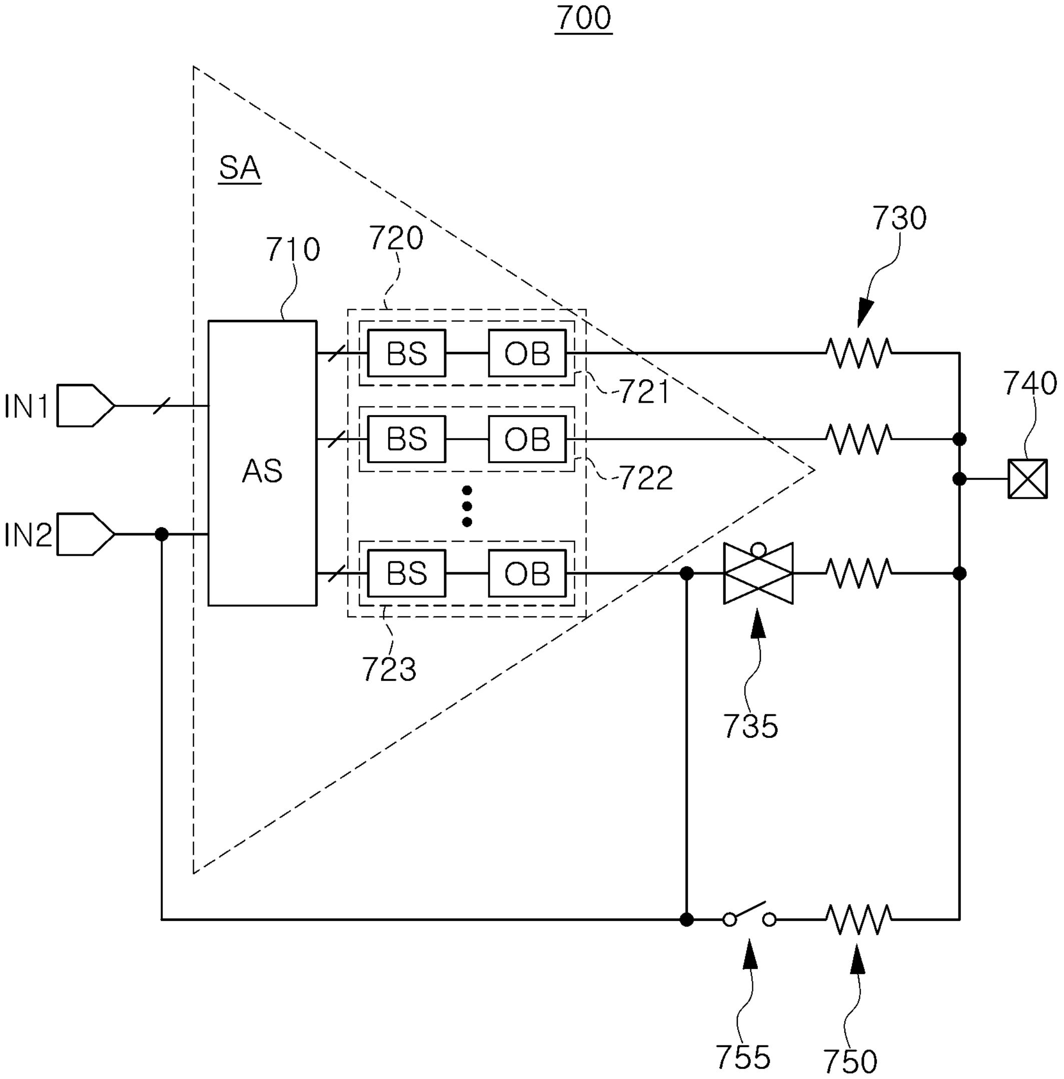
FIG. 13 is a diagram illustrating a display driver according to an example embodiment.

FIG. 13 is a diagram illustrating a display driver according to an example embodiment.

FIG. 13 is a diagram illustrating a portion of components included in a source driver in a display driver 700 according to an example embodiment. Referring to FIG. 13, the source amplifier SA may include an input stage 710 configured to operate as an amplifier circuit and an output stage 720 configured to operate as a buffer circuit.

The input stage 710 may be connected to a first input terminal IN1 and a second input terminal IN2, and may receive at least one gamma voltage through the first input terminal IN1. In example embodiments, the first input terminal IN1 may include non-inverting input terminals separated from each other, and a plurality of gamma voltages having different levels may be input, respectively, through the non-inverting input terminals of the first input terminal IN1.

The output stage 720 may include a plurality of unit circuits 721-723. Each of the plurality of unit circuits 721-723 may include a buffer switch BS and an output buffer OB, and the output buffer OB may be connected to the input stage 310 or may be disconnected from the input stage 310 by operation of the buffer switch BS.

Resistors 730 may be respectively connected between the plurality of unit circuits 721-723 and the output pad 340. A resistor 730 may be connected between the unit circuit 721 and the output pad 740, a resistor 730 may be connected between the unit circuit 722 and the output pad 740, and a resistor 730 may be connected between the unit circuit 723 and the output pad 740. For example, the output pad 740 may be connected to one of a plurality of source lines disposed on the display panel. The voltage output by the source amplifier SA may be input as a grayscale voltage to a selected pixel among a plurality of pixels connected to the source line through the output pad 740.

The second input terminal IN2 of the input stage 710 may be connected to the output pad 540 through a feedback path. For example, a feedback resistor 350 different from the resistor 330, connected to each of the plurality of unit circuits 321-323, and a feedback switch 755 may be connected to the feedback path. Operations of the feedback switch 755 will be described later.

As illustrated in FIG. 13, according to an example embodiment, a plurality of unit circuits 721-723 may be connected in parallel between the input stage 710 and the output pad 740. Also, because resistive components of the plurality of unit circuits 721-723 and the resistor 730 are connected to each other in parallel, a resistive component present between the input stage 710 and the output pad 740 may be reduced. Accordingly, the slew rate of the grayscale voltage supplied to the source line through the output pad 740 may improve.

As illustrated in FIG. 13, an output switch 735 may be further connected between at least one unit circuit of the plurality of unit circuits 721-723 and the output pad 740. Accordingly, as compared to example embodiments discussed above with respect to FIG. 5, the circuit area occupied by the display driver 700 may increase. Also, by directly connecting the input terminal of the output switch 735 to the second input terminal IN2 of the input stage 710 through a feedback path, the feedback path may be maintained while the display driver 700 operates, such that output of the source amplifier SA may be changed swiftly.

Figure 14:
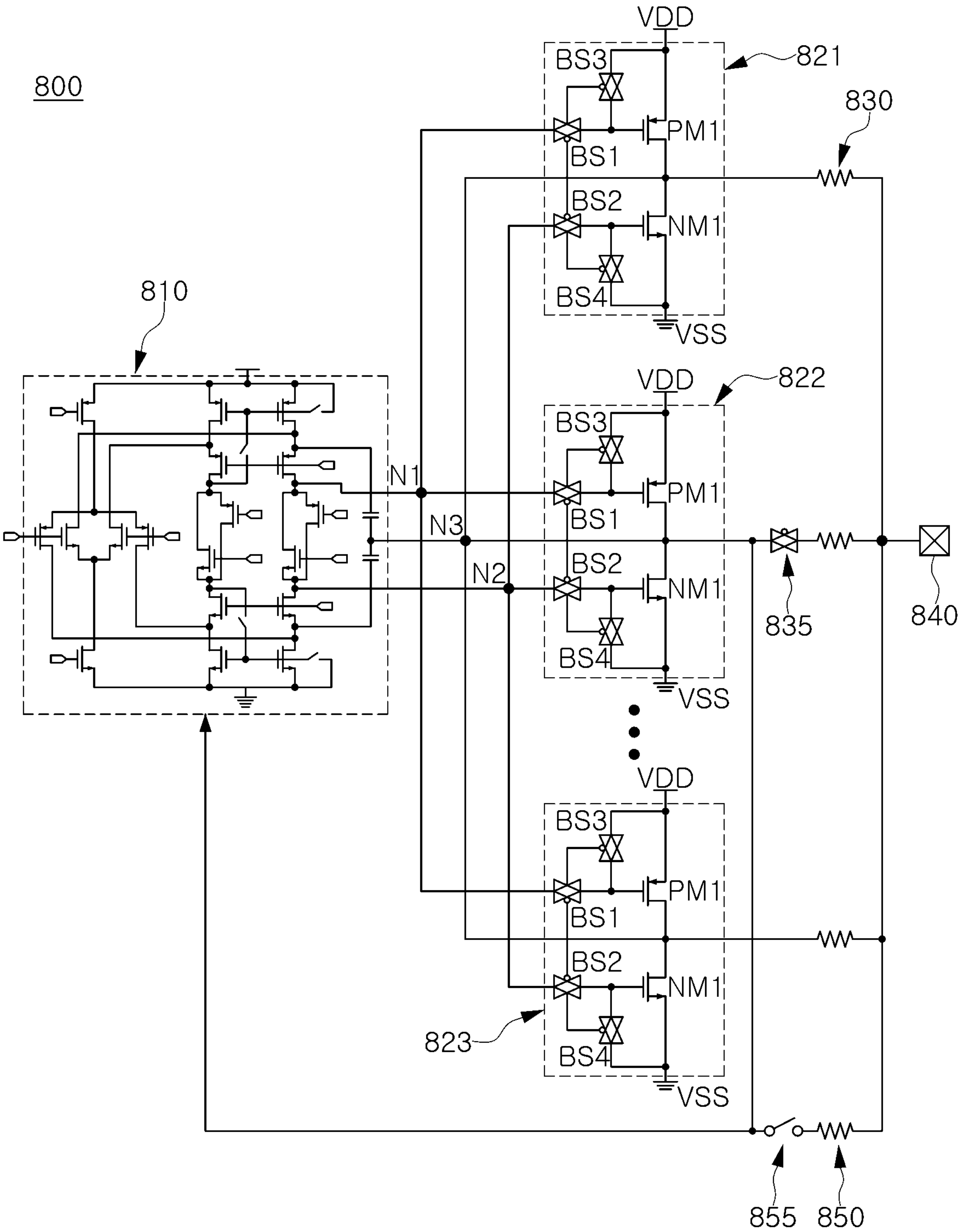
FIG. 14 is a diagram illustrating a structure of a source amplifier included in a display driver according to an example embodiment.

FIG. 14 is a diagram illustrating a structure of a source amplifier included in a display driver according to an example embodiment.

Referring to FIG. 14, a plurality of unit circuits 821-823 may be connected to an input stage 810 in the source amplifier 800 of the display driver, and the plurality of unit circuits 821-823 may be connected to each other in parallel between the input stage 810 and the output pad 840. The configuration of the input stage 810 may be the same as the input stage 310 described above with reference to FIG. 6. Resistors 830 may be respectively connected between the plurality of unit circuits 821-823 and the output pad 840. A resistor 830 may be connected between the unit circuit 821 and the output pad 840, a resistor 830 may be connected between the unit circuit 822 and the output pad 840, and a resistor 830 may be connected between the unit circuit 823 and the output pad 840.

Each of the plurality of unit circuits 821-823 may be connected to the input stage 810 through first to third nodes N1-N3. The voltage amplified and output by the input stage 810 may be buffered in each of the plurality of unit circuits 821-823, and may be supplied to the display panel as a grayscale voltage through the output pad 840. Accordingly, a grayscale voltage may be output to the output pad 840 by the current flowing through each of the plurality of unit circuits 821-823, and each of the plurality of unit circuits 821-823 may be implemented with devices having a relatively small size as compared to a structure in which only one unit circuit is connected between the input stage 810 and the output pad 840.

Structures of the input stage 810 and the plurality of unit circuits 821-823 may be similar to the examples described above with reference to FIGS. 6 and 7. For example, the input stage 810 may have a folded cascode structure, and may include first to seventh PMOS transistors MP1-MP7, first to seventh NMOS transistors MN1-MN7, and first to fourth control transistors MC1 to MC4. Also, the input stage 810 may include first to fourth amplifying switches AS1 to AS4, and the first to fourth amplifying switches AS1 to AS4 may maintain a turned-on state while the source amplifier is activated and outputs the grayscale voltage to the display panel.

Each of the plurality of unit circuits 821-823 may include a plurality of buffer switches BS1-BS4, a PMOS transistor PM, and an NMOS transistor NM. The PMOS transistor PM and the NMOS transistor NM included in each of the plurality of unit circuits 821-823 may be implemented using devices having a size smaller than those of devices included in the input stage 810. For example, when N unit circuits 821-823 are connected in parallel between the input stage 810 and the output pad 840, the size of each of the PMOS transistor PM and the NMOS transistor NM may be 1/N times the size of an individual device included in the input stage 810.

A node between the resistor 830 and the output pad 840 may be connected to one of the input terminals of the input stage 810 through the feedback resistor 850. Also, at least one unit circuit 823 may be connected to the resistor 830 through an output switch 835, and a node between the output switch 835 and the at least one unit circuit 823 may be connected to one of the input terminals of the input stage 810 through a feedback path. Also, as illustrated in FIG. 14, a node between the output switch 835 and at least one unit circuit 823 may be connected to the output pad 840 through the feedback switch 855 and the feedback resistor 850.

The node between the output switch 835 and the at least one unit circuit 823 may be connected to one of the input terminals of the input stage 810 while the display driver including the source amplifier 800 operates, that is, while the display panel displays an image. Accordingly, a feedback path connecting one of the input terminals of the source amplifier to the output terminal may be always maintained. Because the feedback path between one of the input terminals of the source amplifier and the output terminal is maintained, the level of the voltage output by the source amplifier may be changed in advance, and accordingly, the grayscale voltage which the source amplifier should output later may be reflected in the input stage 810 in advance. In this case, by controlling the buffer switches BS1-BS4 and the output switch 835 included in each of the plurality of unit circuits 821-823, the grayscale voltage reflected in the input stage 810 in advance may not be output to the output pad 840.

The number of unit circuits connected to the output pad 840 through the output switch 835 may be less than the number of unit circuits connected to the output pad 840 only through the resistor 830 without the output switch 835. For example, one unit circuit (e.g., unit circuit 823) may be connected to the output pad 840 through the output switch 835, and two unit circuit (e.g., unit circuit 821 and unit circuit 822) may be connected to the output pad 840 only through the resistors 830, without the output switch 835. By connecting a relatively small number of the output switches 835 between the source amplifier and the output pad 840, an increase in the area of the display driver including the source amplifier 800 may be reduced.

FIGS. 15 to 17, 18A and 18B are diagrams illustrating operations of a display driver according to an example embodiment.

Referring to FIGS. 15 to 17, 18A and 18B, the source driver 900 may be connected to the source line SL of the display panel 1000. The plurality of pixels PX1 and PX2 may be connected to the source line SL, and the plurality of pixels PX1 and PX2 may be connected to the gate driver 1010 through the gate lines GL1 and GL2. The gate driver 1010 may scan the gate lines GL1 and GL2 and may select the plurality of pixels PX1 and PX2 in sequence.

Figure 15:
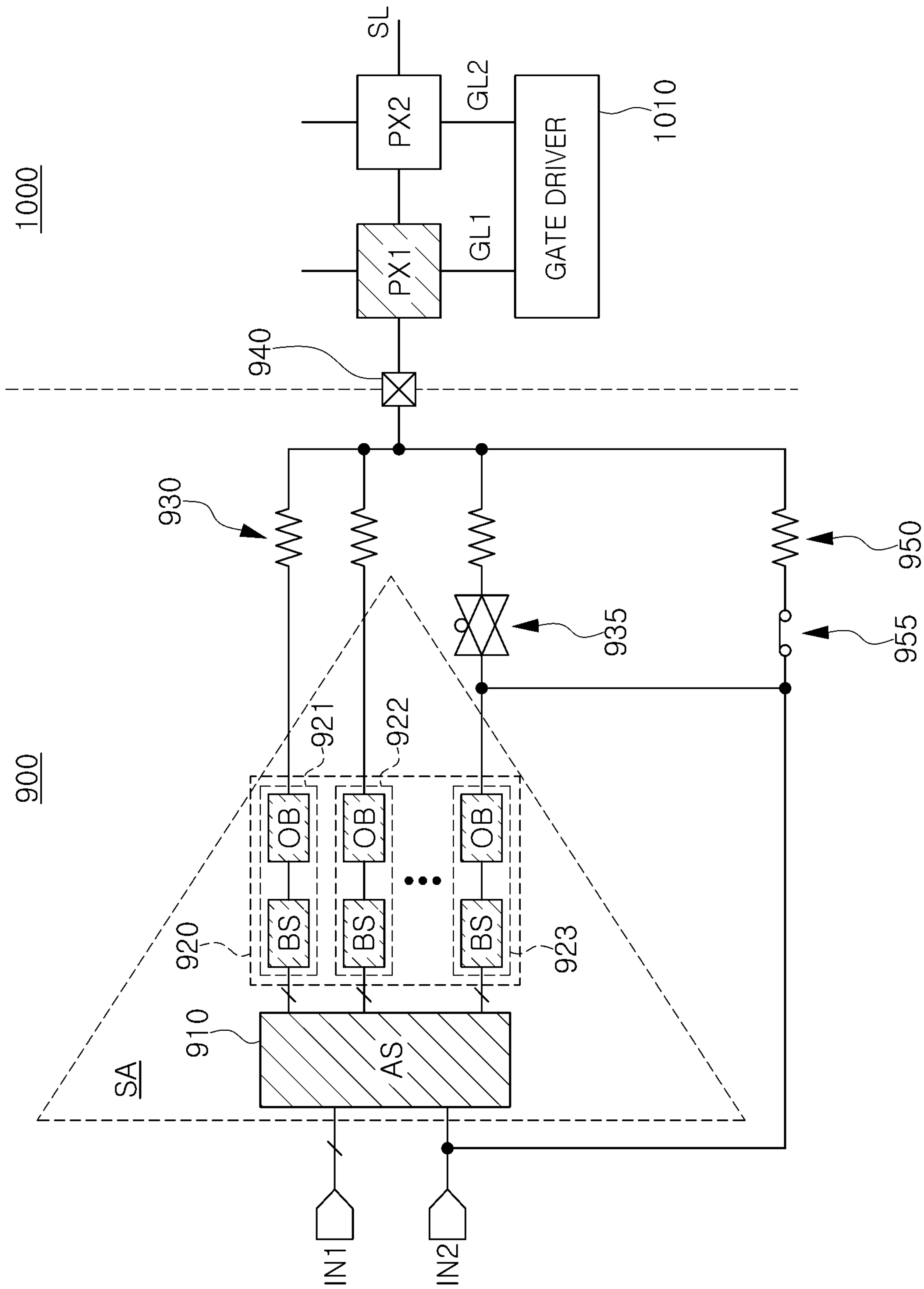
FIGS. 15 to 17, 18A and 18B are diagrams illustrating operations of a display driver according to an example embodiment.

FIG. 15 is a diagram illustrating operation during a first time period in which the gate driver 1010 selects the first pixel PX1. When the gate driver 1010 selects the first pixel PX1 during the first time period, the source amplifier 910 of the source driver 900 may output the first grayscale voltage. The first grayscale voltage may have a level corresponding to image data to be displayed by the first pixel PX1. The decoder circuit connected to the source amplifier 910 may select a gamma voltage required for the source amplifier 910 to output the first grayscale voltage and may input the voltage to the first input terminal IN1. For example, gamma voltages having different levels may be simultaneously input to the first input terminal IN1, and in this case, an average level of the gamma voltages may be determined to be the level of the first grayscale voltage.

The source amplifier 910 may include an input stage 911 configured to operate as an amplifier circuit, and a plurality of unit circuits 921-923. The plurality of unit circuits 921-923 may form an output stage of the source amplifier SA, and may operate as a buffer circuit buffering a voltage output by the input stage 911 and outputting the buffered voltage to the output pad 940. The output pad 940 may be connected to the plurality of unit circuits 921-923 via resistors 930, and the output pad 940 may be connected to the second input terminal IN2 through a feedback resistor 950 and a feedback switch 955.

The plurality of unit circuits 921-923 may be connected in parallel between the input stage 911 and the output pad 940. Also, at least one unit circuit 923 of the plurality of unit circuits 921-923 may be connected to the resistor 930 through an output switch 935. A node between the at least one unit circuit 923 and the output switch 935 may be directly connected to the second input terminal IN2 through a feedback path. Accordingly, the feedback path of the source amplifier 910 may always be maintained. Also, each of the unit circuits 921-922 other than the at least one unit circuit 923 may be directly connected to the resistor 930.

Each of the plurality of unit circuits 921-923 may include a buffer switch BS and an output buffer OB. As described above, because the current output by the input stage 911 is dispersed throughout the plurality of unit circuits 921-923, the buffer switch BS and/or the output buffer OB may be implemented by devices having a relatively small size.

Figure 16:
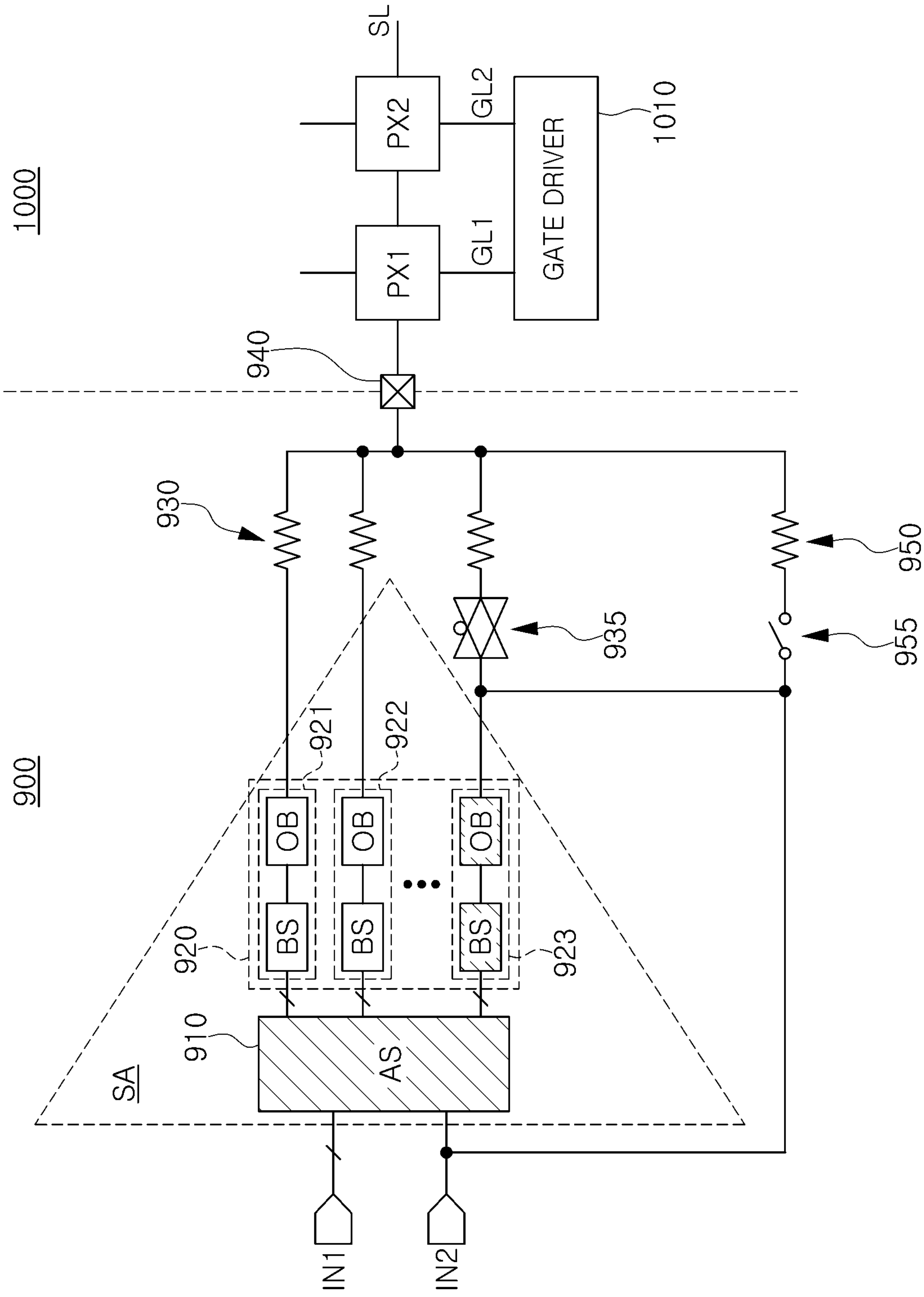

During a first time period in which the gate driver 1010 selects the first pixel PX1, the buffer switch BS, the output switch 935, and the feedback switch 955 may be turned on. When the first time period ends, as illustrated in FIG. 16, a buffer switch BS included in each of the other unit circuits 921-922 other than at least one unit circuit 923 of the plurality of unit circuits 921-923 may be turned off. Also, the output switch 935 and the feedback switch 955 may also be turned off.

Referring to FIG. 16, the buffer switch BS included in the at least one unit circuit 923 may maintain a turned-on state even after a first time period has elapsed. Accordingly, a node between the at least one unit circuit 923 and the output switch 935 may maintain a state of being connected to the second input terminal IN2. According to an example embodiment, after the first time period has elapsed, the levels of the gamma voltages input to the first input terminal IN1 of the source amplifier 910 may be adjusted.

For example, after the first time period has elapsed, a gamma voltage having a level corresponding to the second grayscale voltage to be input to the second pixel PX2 may be input to the first input terminal IN1 of the source amplifier 910. Accordingly, before the gate driver 1010 selects the second pixel PX2 and the source driver 900 outputs the second grayscale voltage to the second pixel PX2, a voltage of a node between the at least one unit circuit 923 and the output switch 935 may be adjusted to a level corresponding to the second grayscale voltage in advance.

Figure 17:
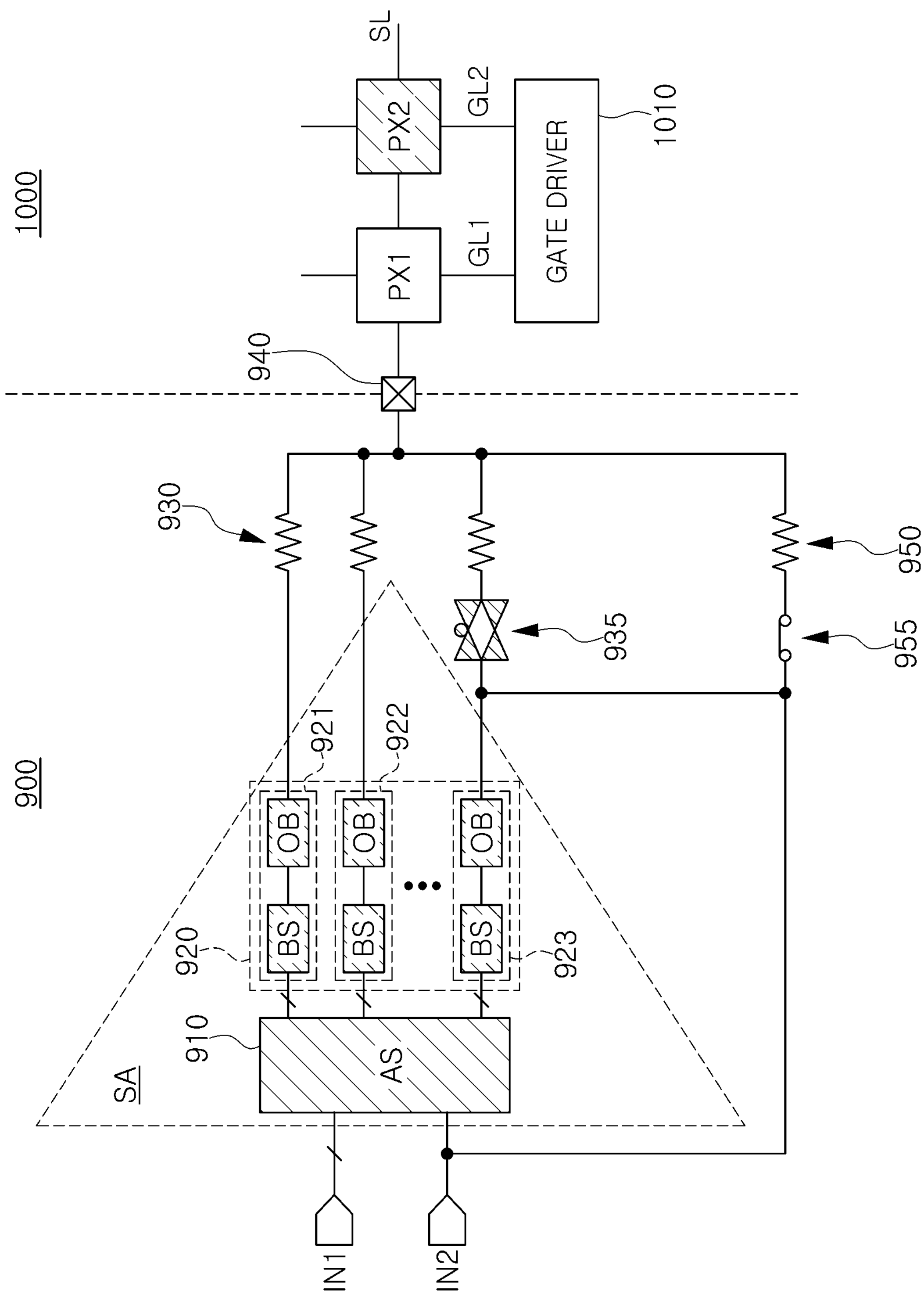

Referring to FIG. 17, during a second time period after the first time period, the gate driver 1010 may select the second pixel PX2. When the gate driver 1010 selects the second pixel PX2, the source amplifier 910 of the source driver 900 may output a second grayscale voltage corresponding to image data for the second pixel PX2 to display.

As described above, while the output switch 935 and the feedback switch 955 maintain the turn-off state between the first time period and the second time period, a gamma voltage necessary for outputting the second grayscale voltage may be input to the first input terminal IN1 of the source amplifier 910 in advance. Accordingly, when the second time period starts, the voltage of the output pad 940 may be rapidly increased to the second grayscale voltage, and the display panel 1000 may be driven at a high scan rate.

Figure 18A:
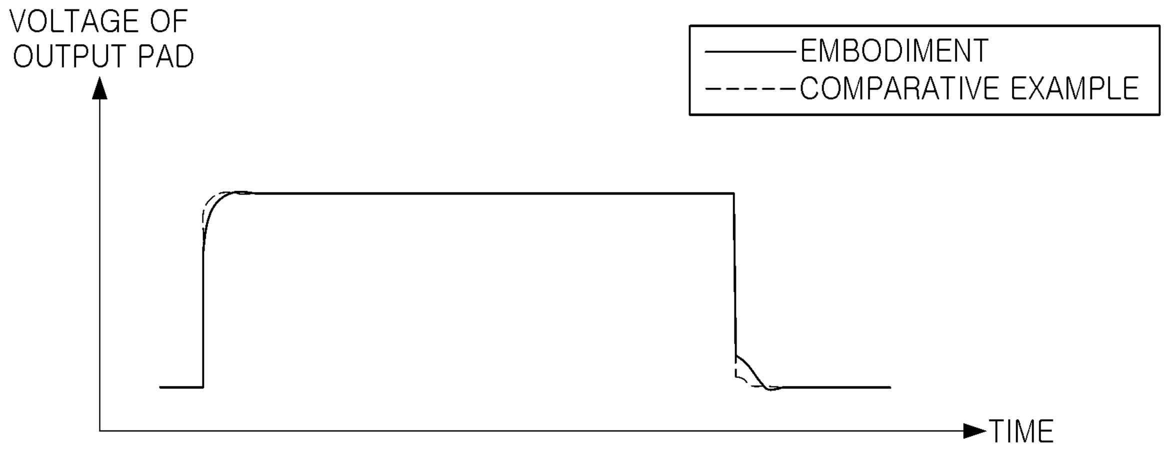
Figure 18B:
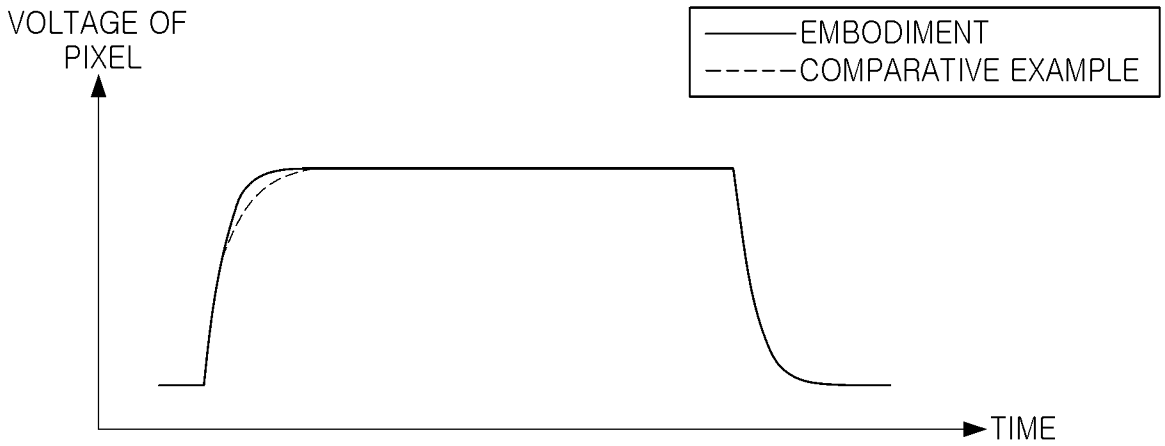

FIGS. 18A and 18B are diagrams illustrating the grayscale voltage output by the source driver 900 described with reference to FIGS. 15 to 17. In the graphs illustrated in FIGS. 18A and 18B, the line corresponding to the embodiment label is a graph obtained by measuring the grayscale voltage output by the source amplifier 910 according to example, embodiments, which includes the plurality of unit circuits 921-923 as described with reference to FIGS. 15 to 17. The line corresponding to the comparative example label is a graph in which a grayscale voltage are measured in a structure in which an output stage is configured with only one unit circuit in the source amplifier and an output switch is connected between a unit circuit and an output pad.

The graph in FIG. 18A represents the voltage measured by the output pad 940. Referring to FIG. 18A, the slew rate of the voltage of the output pad 940 according to example embodiments in which the output stage is configured with the plurality of unit circuits 921-923 is higher than the slew rate of the voltage of the output pad 940 in the comparative example in which the output stage is configured with only one unit circuit.

The graph in FIG. 18B is a graph representing a voltage measured at a pixel connected to the output pad 940 through a source line. Similar to the graph of FIG. 18A, in FIG. 18B the slew rate of the voltage measured from the pixel in embodiments in which the output stage is configured with the plurality of unit circuits 921-923 is higher than the slew rate of the voltage measured from the pixel in the comparative example in which the output stage is configured with only a single unit circuit.

As an example, when the grayscale voltage increases to a swing level of 5V, the rise time period in which the voltage of the output pad 940 increases to the level of the level of the grayscale voltage in the comparative example may be 0.5 μs or more, whereas the rise time period in which the voltage of the output pad 540 increases to the level of the grayscale voltage may be about 0.45 μs. Also, the rise time period required for the voltage of the pixel to increase to the level of the grayscale voltage in the comparative example may be about 1.6 μs, whereas the rise time period may be around 1.6 is in example embodiments. Accordingly, in example embodiments, about 20% of slew rate improvement may be obtained as compared to the comparative example, and the display panel may be driven even under a high scan rate condition in which the horizontal period is limited.

As described with reference to FIGS. 15 to 17, 18A and 18B, a feedback path may be secured by connecting a node between at least one unit circuit 923 and the output switch 935 to the second input terminal IN2. Also, because the gamma voltage input to the first input terminal IN1 may be adjusted to a level corresponding to the second grayscale voltage in advance between the first time period and the second time period, a relatively higher slew rate may be secured as compared to example embodiments described with reference to FIGS. 12A and 12B.

Figure 19:
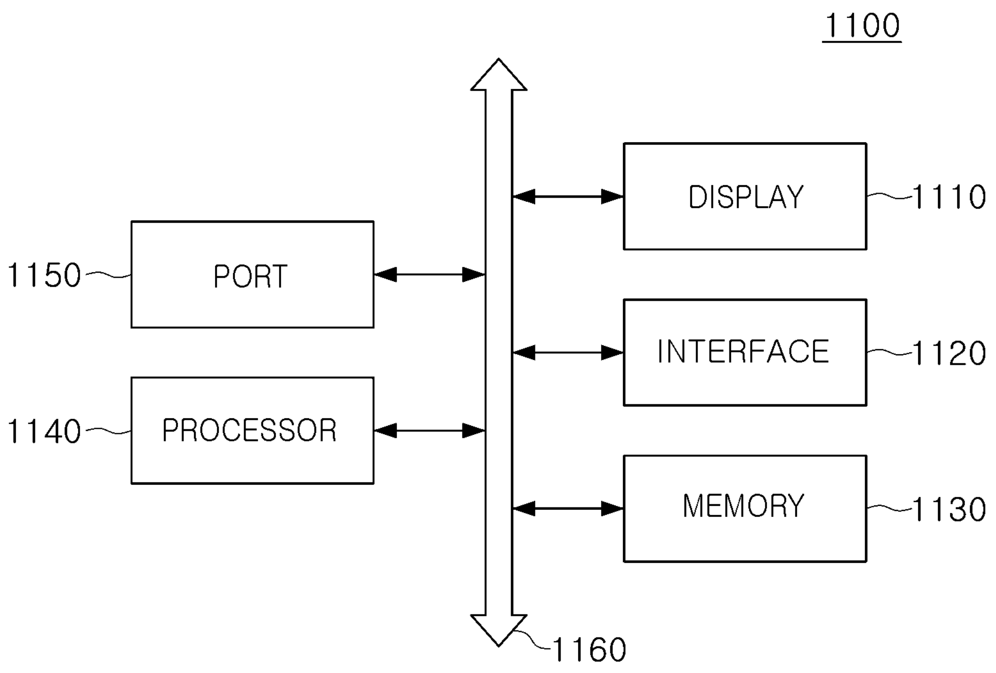
FIG. 19 is a block diagram illustrating an electronic device including a display device according to an example embodiment.

FIG. 19 is a block diagram illustrating an electronic device including a display device according to an example embodiment.

Referring to FIG. 19, an electronic device 1100 according to an example embodiment may include a display 1110, an input/output interface 1120, a memory 1130, a processor 1140, and a port 1150. The electronic device 1100 may include a television, and a desktop computer in addition to mobile devices such as a smart phone, a tablet PC, and a laptop computer. The components such as the display 1110, the input/output interface 1120, the memory 1130, the processor 1140, and the port 1150 may communicate with each other through the bus 1160.

The display 1110 may include a display driver and a display panel. According to an example embodiment, the display driver may display image data transmitted by the processor 1140 through the bus 1160 on the display panel. The display driver may generate gamma voltages, the number of which correspond to the number of bits of image data transmitted by the processor 1040, and the display driver may select at least a portion of the gamma voltages depending on the image data and may input the voltages to the buffers of source drivers.

In example embodiments, the display driver may drive the display panel at a scan rate higher than 144 Hz. According to an example embodiment, each of the source amplifiers for outputting the grayscale voltage to the source lines of the display panel may be implemented as an amplifier circuit and a plurality of unit circuits connected to an output terminal of the amplifier circuit. The plurality of unit circuits may be connected to each other in parallel, and accordingly, a resistive component between an output pad connected to the source line and an output terminal of the amplifier circuit may be reduced such that a slew rate may improve.

Because the current output by the amplifier circuit is dispersed throughout the plurality of unit circuits, devices required to implement each of the plurality of unit circuits may be formed in a relatively small size. Accordingly, the plurality of unit circuits may be connected to the output terminal of the amplifier circuit, and an increase in circuit region may be reduced.

As discussed above, the display driver may connect a plurality of unit circuits in parallel between the input stage of the source amplifier and the output pad, and each of the plurality of unit circuits may include a buffer switch and an output buffer. Accordingly, by lowering the resistance value between the output terminal of the input stage which outputs the grayscale voltage and the output pad, a display driver which may improve the slew rate of the grayscale voltage supplied to the source line through the output pad and may drive the display panel at a high scan rate may be implemented.

While aspects of example embodiments have been illustrated and described, it will be configured as apparent to those skilled in the art that modifications and variations could be made without departing from the scope as defined by the appended claims.

What is claimed is:

1. A display driver comprising:

a plurality of source amplifiers connected to a plurality of source lines of a display panel, wherein a first source amplifier of the plurality of source amplifiers comprises an input stage and an output stage configured to output a grayscale voltage to a source line of the plurality of source lines; and a decoder circuit configured to provide at least one of a plurality of gamma voltages to the input stage based on image data, wherein the output stage of the first source amplifier comprises a plurality of unit circuits connected to each other in parallel between the input stage of the first source amplifier and an output pad connected to the source line, and wherein each of the plurality of unit circuits comprises a buffer switch and an output buffer connected to the input stage of the first source amplifier, and is connected to the output pad through a resistor.

2. The display driver of claim 1, wherein the plurality of unit circuits comprises at least three unit circuits.

3. The display driver of claim 1, wherein, in each of the plurality of unit circuits, the resistor is directly connected between an output terminal of the output buffer and the output pad.

4. The display driver of claim 1, wherein the output buffer comprises a PMOS transistor connected to a first power node, and an NMOS transistor connected to a second power node, and wherein the buffer switch comprises a first buffer switch connected between a gate of the PMOS transistor and the input stage, a second buffer switch connected between a gate of the NMOS transistor and the input stage, a third buffer switch connected between the gate of the PMOS transistor and the first power node, and a fourth buffer switch connected between the gate of the NMOS transistor and the second power node.

5. The display driver of claim 4, wherein each of the first buffer switch, the second buffer switch, the third buffer switch, and the fourth buffer switch comprises a CMOS transfer gate.

6. The display driver of claim 4, wherein the PMOS transistor and the NMOS transistor are smaller than transistors provided in the input stage.

7. The display driver of claim 4, wherein the buffer switch included in each of the plurality of unit circuits is controlled by a first enable signal and a second enable signal which is a complementary signal of the first enable signal.

8. The display driver of claim 4, wherein the buffer switch provided in a first unit circuit of the plurality of unit circuits is controlled by a first enable signal and a second enable signal which is a complementary signal of the first enable signal, and wherein the buffer switch provided in a second unit circuit of the plurality of unit circuits is controlled by a third enable signal and a fourth enable signal different from the first enable signal and the second enable signal.

9. The display driver of claim 8, wherein the second unit circuit is configured to maintain a connection with the input stage based on the third enable signal and the fourth enable signal.

10. The display driver of claim 8, wherein the second unit circuit comprises a node provided between the PMOS transistor and the NMOS transistor, and an output switch connected to the resistor.

11. The display driver of claim 10, wherein the output switch comprises a CMOS transfer gate.

12. The display driver of claim 8, wherein a node disposed between the PMOS transistor and the NMOS transistor included in the second unit circuit is directly connected to one of input terminals of the input stage through a feedback path.

13. The display driver of claim 1, wherein the input stage comprises a first input terminal configured to receive at least one gamma voltage from among the plurality of gamma voltages, and a second input terminal connected to the output pad through a feedback resistor, and wherein a first end of the feedback resistor is connected to a node between the plurality of unit circuits and the output pad.

14. The display driver of claim 13, wherein the first input terminal comprises a plurality of first input terminals configured to receive, respectively, the plurality of gamma voltages.

15. A display driver comprising:

an output pad connected to one of a plurality of source lines of a display panel, each of the plurality of source lines being connected to a plurality of pixels; and a source amplifier configured to generate a grayscale voltage corresponding to a selected pixel among the plurality of pixels based on at least one gamma voltage, wherein the source amplifier comprises an amplifier circuit configured to receive the at least one gamma voltage and a plurality of buffer circuits connected to each other in parallel between the amplifier circuit and the output pad, wherein each of the plurality of buffer circuits comprises an output buffer and a buffer switch connected between the output buffer and the amplifier circuit, wherein the source amplifier is configured to output a first grayscale voltage corresponding to a first pixel among the plurality of pixels during a first time period, and output a second grayscale voltage corresponding to a second pixel during a second time period subsequent to the first time period, and wherein each of the plurality of buffer circuits is configured to turn off the buffer switch between the first time period and the second time period to disconnect the output buffer of each the plurality of buffer circuits from the amplifier circuit.

16. The display driver of claim 15, wherein the buffer switch comprises a first buffer switch connected between a gate of a PMOS transistor and the amplifier circuit, a second buffer switch connected between a gate of an NMOS transistor and the amplifier circuit, a third buffer switch connected between the gate of the PMOS transistor and a first power node, and a fourth buffer switch connected between the gate of the NMOS transistor and a second power node.

17. The display driver of claim 16, wherein the first buffer switch, the second buffer switch, the third buffer switch and the fourth buffer switch are configured to simultaneously on and off.

18. A display driver comprising:

an output pad connected to one of a plurality of source lines of a display panel, each of the plurality of source lines being connected to a plurality of pixels; and a source amplifier configured to generate a grayscale voltage corresponding to a selected pixel among the plurality of pixels based on at least one gamma voltage, wherein the source amplifier comprises an amplifier circuit configured to receive the at least one gamma voltage and a plurality of buffer circuits connected in parallel with each other between the amplifier circuit and the output pad, wherein the amplifier circuit comprises a plurality of input terminals and each of the plurality of buffer circuits comprises an output buffer, wherein an output switch is connected between a first buffer circuit of the plurality of buffer circuits and the output pad, and a node between an output terminal of the output buffer of the first buffer circuit and the output switch is connected to a first input terminal of the plurality of input terminals through a feedback path, wherein the source amplifier is configured to output a first grayscale voltage corresponding to a first pixel among the plurality of pixels during a first time period, and output a second grayscale voltage corresponding to a second pixel during a second time period subsequent to the first time period, and wherein the source amplifier is configured to adjust a level of the at least one gamma voltage input to the amplifier circuit to correspond to the second grayscale voltage while the output switch is turned off between the first time period and the second time period.

19. The display driver of claim 18, wherein each of the plurality of buffer circuits further comprises a buffer switch connected between the output buffer and the amplifier circuit, and wherein the buffer switch provided in each of a first group of buffer circuits of the plurality of buffer circuits is configured to be off together with the output switch, and the buffer switch provided in a second group of buffer circuits of the plurality of buffer circuits is configured to be on between the first time period and the second time period.

20. The display driver of claim 19, wherein the first group comprises a greater number of buffer circuits than the second group.

* * * * *